United States Patent [19]
Watanabe et al.

[11] Patent Number: 5,717,132
[45] Date of Patent: Feb. 10, 1998

[54] CANTILEVER AND PROCESS FOR FABRICATING IT

[75] Inventors: Shunji Watanabe, Tokyo; Takamitsu Fujiu, Zama, both of Japan

[73] Assignee: Nikon Corporation, Tokyo, Japan

[21] Appl. No.: 637,389

[22] Filed: Apr. 25, 1996

[30] Foreign Application Priority Data

| May 26, 1993 | [JP] | Japan | ................... 7-127598 |
| Apr. 26, 1995 | [JP] | Japan | ................... 7-102719 |
| May 26, 1995 | [JP] | Japan | ................... 7-127598 |

[51] Int. Cl.$^6$ ........................... G01B 5/28; G01N 23/00
[52] U.S. Cl. ........................................................... 73/105
[58] Field of Search .............................. 73/105, 866.5; 250/306

[56] References Cited

U.S. PATENT DOCUMENTS

| 5,021,364 | 6/1991 | Akamine et al. | 437/228 |
| 5,066,358 | 11/1991 | Quate et al. | 156/647 |
| 5,193,385 | 3/1993 | Nishioka et al. | 73/105 |
| 5,268,571 | 12/1993 | Yamamoto et al. | 250/306 |
| 5,276,672 | 1/1994 | Miyazaki et al. | 73/105 X |
| 5,537,863 | 7/1996 | Fujiu et al. | 73/105 |
| 5,594,166 | 1/1997 | Itoh et al. | 73/105 |

FOREIGN PATENT DOCUMENTS

| 488133 | 6/1992 | European Pat. Off. | 73/105 |
| 01-262403 | 10/1989 | Japan . | |
| 03-218998 | 9/1991 | Japan . | |
| 06-26807 | 2/1994 | Japan . | |

OTHER PUBLICATIONS

Albrecht et al., "MicroFabrication of Cantilever Styli For the Atomic Force Microscope", J. Vac. Sci. Technol. A, vol. 8, No. 4, Jul./Aug. 1990, pp. 3386–3339.

Binnig et al., "Atomic Resolution with Atomic Force Microscope", Europhysics Letters, vol. 3, No. 12, 15 Jun. 1987, pp. 1281–1286.

M. Tortonese, et al., "Atomic Resolution With an Atomic Force Microscope Using Piezoresistive Detection", Appl. Phys. Lett. 62 (8), Feb. 22, 1993, pp. 834–836.

Primary Examiner—Hezron E. Williams
Assistant Examiner—Daniel S. Larkin
Attorney, Agent, or Firm—Foley & Lardner

[57] ABSTRACT

A probe formed in a flexible portion of a cantilever is protected by a protection frame. This protection frame is separated from a support portion at a border of a groove between the protection frame and the support portion. A piezoelectric crystal layer is formed in the flexible portion, and when the flexible portion is bent by an interatomic force acting between the probe and a sample, a voltage induced between the both ends of the piezoelectric crystal layer changes.

18 Claims, 34 Drawing Sheets

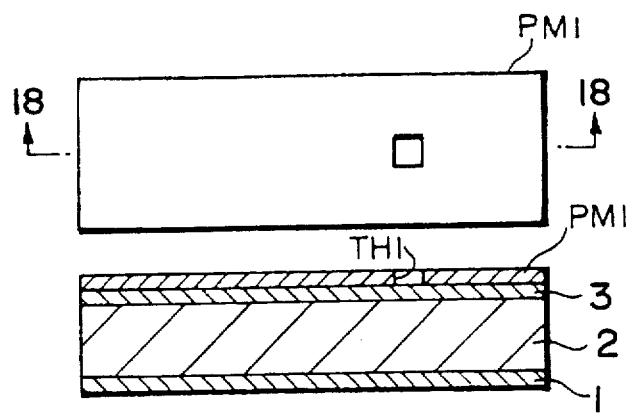
Fig. 17
Fig. 18
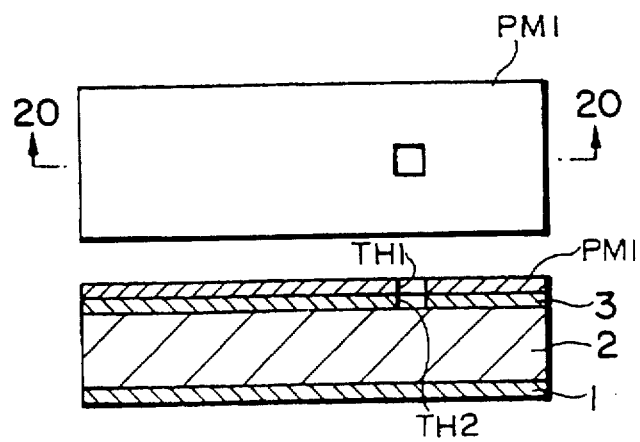
Fig. 19
Fig. 20
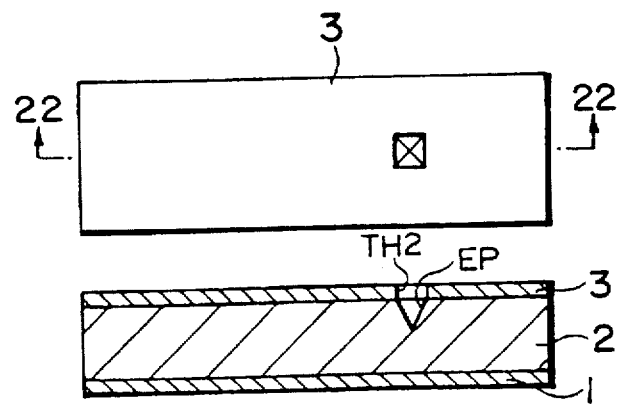
Fig. 21
Fig. 22

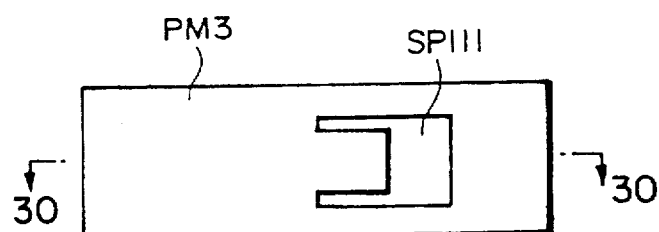
Fig.29
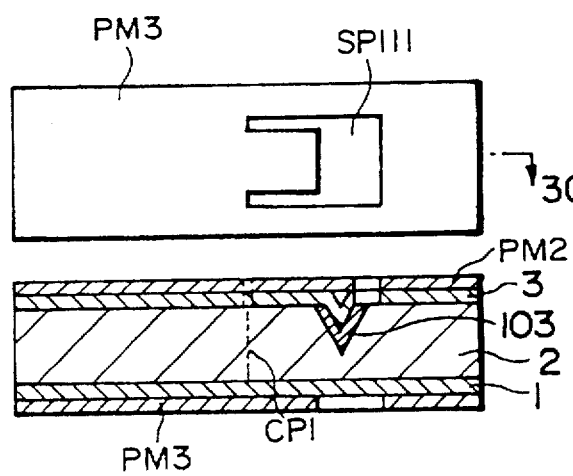
Fig.30
Fig.31
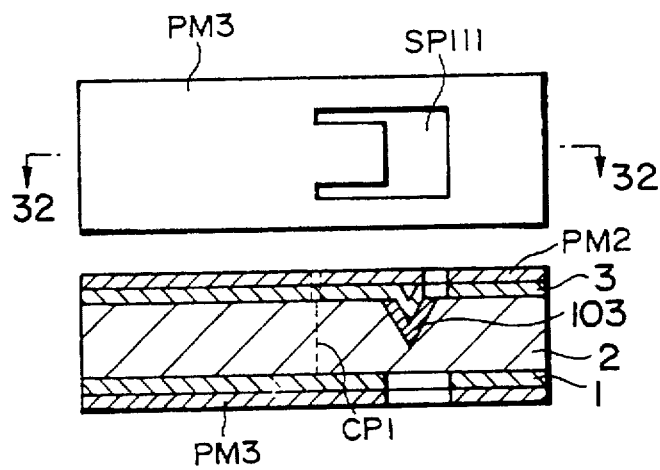
Fig.32
Fig.33
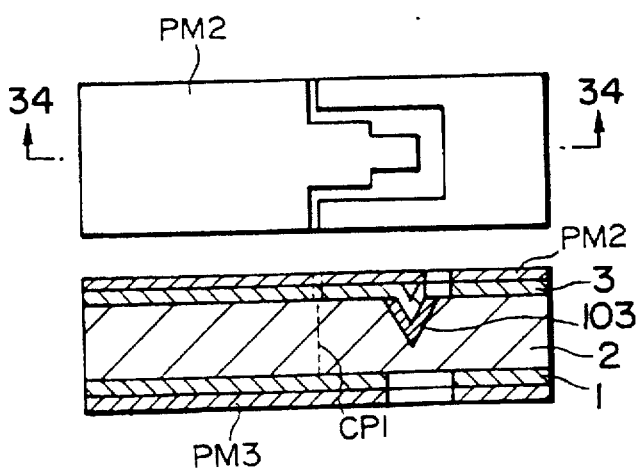
Fig.34

Fig.45

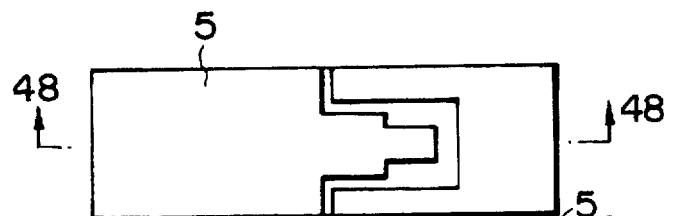
Fig.47
Fig.48
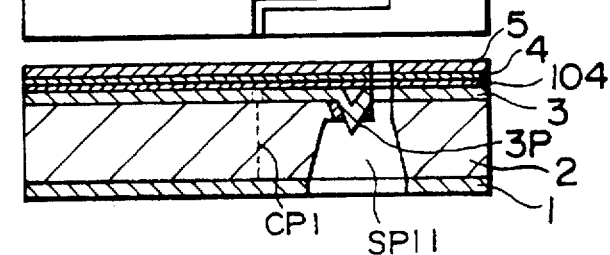
Fig.49
Fig.50
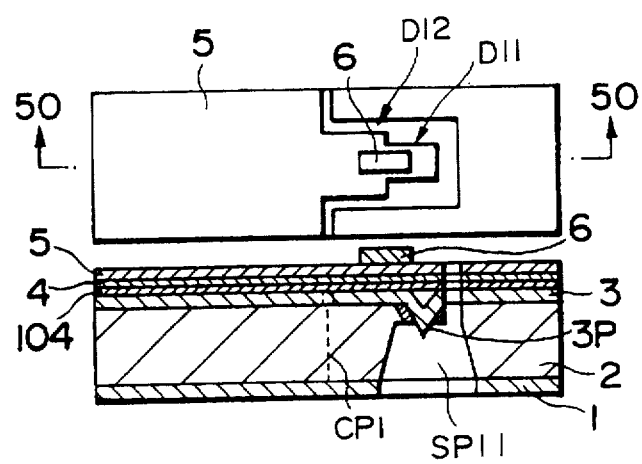
Fig.51
Fig.52

5,717,132

CANTILEVER AND PROCESS FOR FABRICATING IT

BACKGROUND OF THE INVENTION

1. Field of the Invention

The present invention relates to a cantilever. More particularly, the invention concerns the cantilever used in a scanning probe microscope such as an atomic force microscope, and a process for fabricating it.

2. Related Background Art

The atomic force microscope (AFM) is a scanning probe microscope having as high resolving power as a scanning tunnel microscope (STM). This AFM has a the cantilever. When the tip of the cantilever is brought to the vicinity (about 10 nm) of a surface of a measured sample, interatomic force acts between them. The interatomic force is a resultant of electrostatic force, magnetic force, and van der waals force acting between the atoms constituting the sample and the tip of cantilever. The configuration of the surface of the measured sample can be measured by detecting amounts of deflection of the cantilever caused by the interatomic force as scanning the sample with the cantilever. Since the interatomic force also works between the cantilever and a sample without electric conductivity, surfaces of insulating materials or organic molecules can be observed in the resolution of the nanometer order, using the AFM.

FIG. 94 is an explanatory drawing to illustrate the principle of AFM. The AFM is provided with a cantilever consisting of a needlelike tip with a small radius of curvature at the tip and a flexible plate, and a displacement detecting system for measuring flexure (bending) of the flexible plate. Based on a signal associated with the interatomic force detected, a drive system with a sample mounted thereon is moved in the vertical direction (in the Z-direction) in accordance with a Z control signal input thereto. This drive system is also moved in a horizontal plane in accordance with an XY scanning signal input thereto.

The conventional AFMs are described in Japanese Laid-open Patent Applications No. 3-218998, No. 1-262403, No. 4-180786, and Appl. Phys. Lett., 62 (8), p 834, 1993.

SUMMARY OF THE INVENTION

The resolving power of AFM is greatly dependent upon performance of the cantilever, particularly upon the tip (projection) of the cantilever. The cantilever of the present invention has a protection frame, and the tip is protected by the protection frame immediately before actual use. The protection frame is desirably made of a single-crystal silicon material continuously extending from a substrate of the cantilever toward the tip. Single-crystal silicon has cleavability. If a groove is formed by etching along a cleavage plane of silicon in a portion between the substrate of cantilever and the protection frame, a user can remove the protection frame from the cantilever substrate simply by bending the protection frame at the border of the groove with a finger or tweezers. This groove may be formed by scratching the silicon material with a scriber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 17 is a plan view of a cantilever intermediate;

FIG. 18 is a sectional view of the cantilever intermediate when the cantilever intermediate of FIG. 17 is cut along arrow line 18—18;

FIG. 19 is a plan view of a cantilever intermediate;

FIG. 20 is a sectional view of the cantilever intermediate when the cantilever intermediate of FIG. 19 is cut along arrow line 20—23;

FIG. 21 is a plan view of a cantilever intermediate;

FIG. 22 is a sectional view of the cantilever intermediate when the cantilever intermediate of FIG. 21 is cut along arrow line 22—22;

FIG. 29 is a plan view of a cantilever intermediate;

FIG. 30 is a sectional view of the cantilever intermediate when the cantilever intermediate of FIG. 29 is cut along arrow line 30—30;

FIG. 31 is a plan view of a cantilever intermediate;

FIG. 32 is a sectional view of the cantilever intermediate when the cantilever intermediate of FIG. 31 is cut along arrow line 32—32;

FIG. 33 is a plan view of a cantilever intermediate;

FIG. 34 is a sectional view of the cantilever intermediate when the cantilever intermediate of FIG. 33 is cut along arrow line 34—34;

FIG. 45 is a plan view of a cantilever intermediate;

FIG. 47 is a plan view of a cantilever intermediate;

FIG. 48 is a sectional view of the cantilever intermediate when the cantilever intermediate of FIG. 47 is cut along arrow line 48—48;

FIG. 49 is a plan view of a cantilever intermediate;

FIG. 50 is a sectional view of the cantilever intermediate when the cantilever intermediate of FIG. 49 is cut along arrow line 50—50;

FIG. 51 is a plan view of an assembly consisting of a cantilever and a wiring substrate;

FIG. 52 is a sectional view of the assembly when the assembly of FIG. 51 is cut along arrow line 52—52;

DESCRIPTION OF THE PREFERRED EMBODIMENTS

Cantilevers associated with the embodiments of the present invention will be explained. In the following description, same elements will be denoted by same symbols, and redundant description will be omitted.

Figure 1:
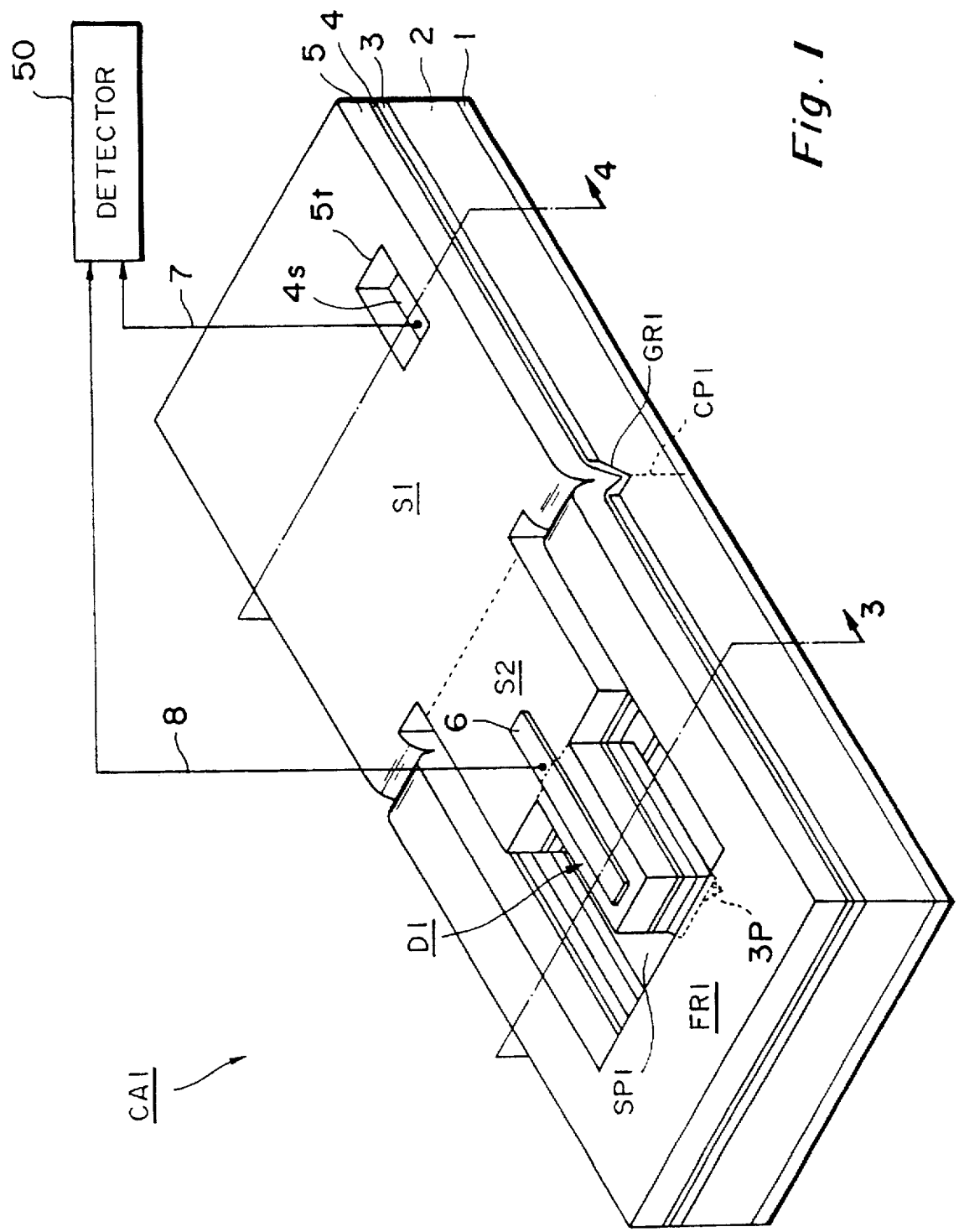
FIG. 1 is a perspective view of a first embodiment of a cantilever.

FIG. 1 shows a first embodiment of a cantilever CA1. This cantilever CA1 has a lower insulating layer 1, a semiconductor layer 2, an upper insulating layer 3, a lower electrode layer 4, a piezoelectric crystal layer 5, and an upper electrode layer 6, and these layers 1 to 6 are laminated in order. The lower insulating layer 1 and upper insulating layer 3 both are made of silicon nitride ($SiN_x$: X is an arbitrary constant; if X =4/3 then $SiN_{4/3}=Si_3N_4$). A material selected from the group consisting of silicon dioxide ($SiO_2$), PSG (Phospho-Silicate Glass), and SOG (Spin On Glass) may be applied to the material for the insulating layer 1 or 3. The semiconductor layer 2 is made of Si. This layer 2 also may be made of GaAs. The electrode layers 4 and 6 both are made of platinum (Pt). The piezoelectric crystal layer 5 is made of PZT (lead titanate zirconate). This piezoelectric crystal layer 5 also may be made of PT (lead titanate).

The first cantilever CA1 is composed of four regions S1, S2, D1, and FR1. Let us define a lengthwise direction along a direction directed from the first support portion S1 toward the upper electrode D1 and a widthwise direction along a direction perpendicular to both the lengthwise direction and a thickwise direction of the cantilever CA1.

The first support portion S1 is rectangular when seen from above. The second support portion S2 is also rectangular when seen from above. The second support portion S2 extends along the lengthwise direction continuously from the first support portion S1. The width of the second support portion S2 is narrower than that of the first support portion S1. The flexible portion D1 extends along the lengthwise direction continuously from the second support portion S2. The width of the flexible portion D1 is narrower than that of the second support portion S2, and the thickness of the flexible portion D1 is thinner than that of the second support portion S2. The protection frame FR1 is continuously formed from the first support portion S1, and surrounds a region consisting of the second support portion S2 and flexible portion D1, keeping a predetermined spacing SP1. Namely, the cantilever CA1 has the space SP1 between the inner surface of the protection frame FR1 and this region (S2 and D1).

In the following description associated with the orientation of single crystal, numerical values (hkl) inside parentheses indicate Miller indices for expressing a single plane or a set of parallel planes. Here, h, k, and l are integers. In the following description concerning the orientation of single crystal, numerical values [hkl] inside square brackets indicate a direction normal to the (hkl) plane.

The semiconductor layer 2 is a single crystal, and the principal plane of this semiconductor layer 2 is the (001) plane. Namely, a plane including both the vector [100] in the lengthwise direction and the vector [010] in the widthwise direction is the (001) plane. A groove GR1 is formed at the border between the protection frame FR1 and the first support portion S1. The groove GR1 is formed by etching the semiconductor layer 2 from the top face thereof, and a cross section of the groove is V-shaped. An intersecting line between two side faces of the V-shaped groove GR1 forms the bottom of groove GR1. The bottom of groove GR1 extends along the widthwise direction [010] of cantilever CA1. The (100) plane of the semiconductor layer 2 including the line defined by the bottom of groove GR1 is the cleavage plane CP1 of the single crystal semiconductor layer 2. When a pressure is applied on the protection frame FR1 as the first support portion S1 is fixed in an apparatus, stress is concentrated near the groove GR1 and the groove GR1 is split to expose the cleavage plane CP1. This physically separates the protection frame FR1 from the support portion S1.

Figure 2:
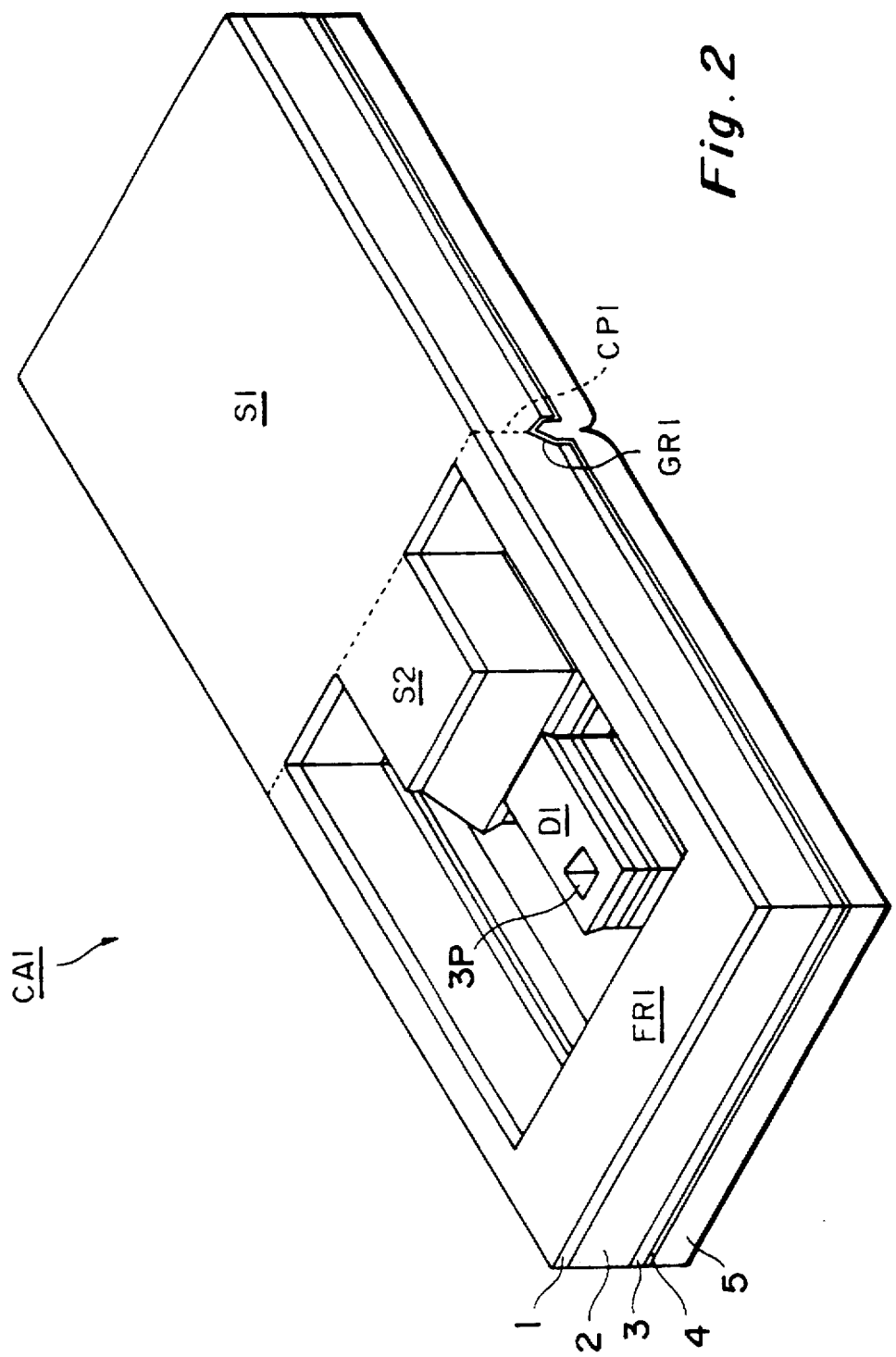
FIG. 2 is a perspective view of the back side of the cantilever shown in FIG. 1.

FIG. 2 is a view of the back side of the cantilever CA1 shown in FIG. 1. The thickness of the flexible portion D1 is thinner than that of the support portion, and the flexible portion D1 has the tip (projection) 3p. The shape of this probe 3p is a rectangular pyramid. The apex of the pyramid 3p is located inside the bottom face of the protection frame FR1 (the exposed surface of the insulating layer 1). Namely, the apex of the pyramid 3p is located between the exposed surface of the insulating layer 1 and the exposed surface of the piezoelectric crystal layer 5 and is surrounded by the inner side faces of the protection frame FR1. The pyramid 3p has four side faces, one of which is the (111) plane and the other three of which are planes equivalently symmetric to the (111) plane.

Figure 3:
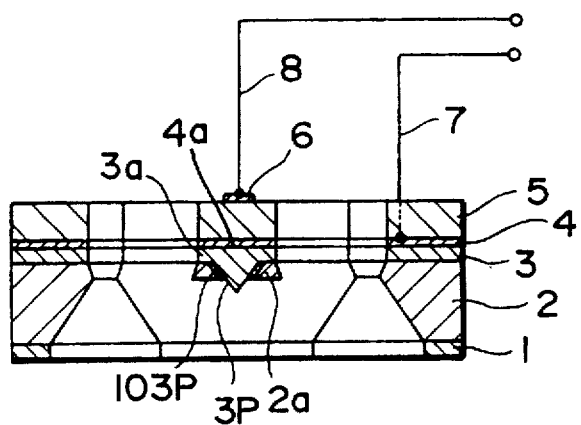
FIG. 3 is a sectional view of the cantilever when the cantilever of FIG. 1 is cut along arrow line 3.

FIG. 3 is a sectional view of the cantilever CA1 when the cantilever CA1 of FIG. 1 is cut along arrow line 3. A part of the piezoelectric crystal layer 5 is interposed between the upper electrode 6 and a part 4a belonging to the region D1 of the lower electrode 4. This piezoelectric crystal layer 5 is polarized in the thickwise direction. The electrode layer 6 is formed in a region including the border between the flexible portion D1 and the second support portion S2, and a conductor line 8 is electrically connected to this electrode layer 6. Silicon 2a surrounds the periphery of the pyramid 3p near the base thereof, and a silicon dioxide layer 103p is interposed between the silicon 2p and the probe 3p as covering this region near the base of pyramid 3p, which is the region except for the region near the apical point of the outer faces of the pyramid 3p.

Figure 4:
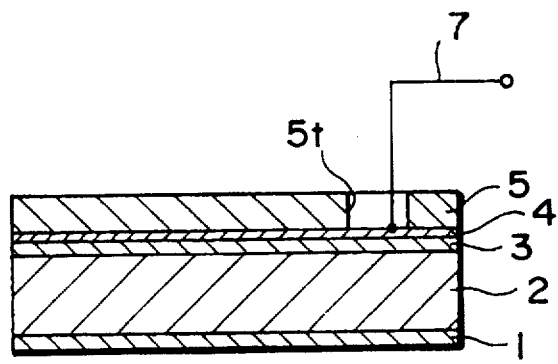
FIG. 4 is a sectional view of the cantilever when the cantilever of FIG. 1 is cut along arrow line 4.

FIG. 4 is a sectional view of the cantilever CA1 when the cantilever CA1 of FIG. 1 is cut along arrow line 4. The piezoelectric crystal layer 5 has a through hole 5t extending from the surface of the piezoelectric crystal layer 5 and reaching the surface of the electrode layer 4. This through hole 5t can be formed using a laser processing device. Accordingly, a region 4s of the electrode layer 4 in the through hole 5t is exposed. A conductor line 7 is electrically connected to this exposed region 4s of the electrode layer.

The interatomic force between the sample surface and the probe 3p depends upon the distance between them. The interatomic force acting between the probe 3p and the sample surface bends the flexible portion D1 of the cantilever CA1. When the flexible portion D1 of the cantilever CA1 is bent, a piezoelectric electromotive force is induced between the electrode 4a and the electrode 6 on either side of the piezoelectric crystal layer 5. This electromotive force appears between the conductor lines 7 and 8 connected to the electrode 4a and electrode 6, respectively. Thus, an amount of flexure of the cantilever CA1 can be detected by detecting the electromotive force with a detector 50 electrically connected to the conductor lines 7 and 8. Since the amount of flexure of cantilever CA1 is detected by the detector 50, the distance between the probe 3p and the sample surface can be measured accordingly. Changes of the sample surface (the configuration) can be measured by measuring the distance between the probe 3p and the sample surface at each of measurement points of the sample surface.

Figure 5:
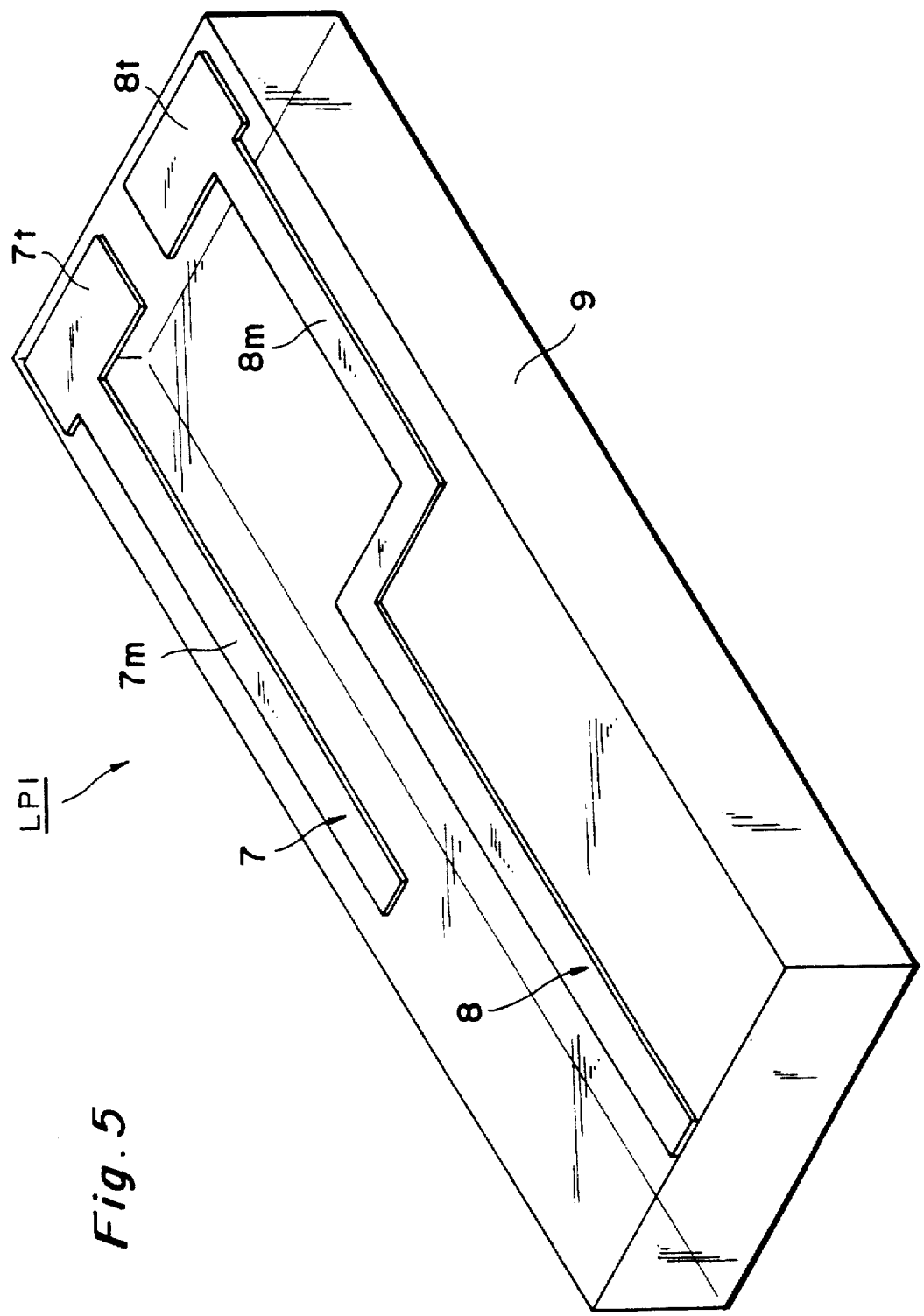
FIG. 5 is a perspective view of a wiring substrate used in combination with the cantilever.

FIG. 5 shows a specific structure of the conductor lines 7 and 8. A substrate LP1 is composed of an insulator substrate 9 and printed conductive patterns (printed wiring lines) 7 and 8 formed thereon. This substrate or plate LP1 is defined as a conductive pattern substrate.

The conductive pattern 7 consists of a straight line pattern 7m and an output terminal 7t. The printed conductive pattern 8 consists of a bent pattern 8m and an output terminal 8t. The insulator substrate 9 is made of a transparent glass. Therefore, the conductive patterns 7 and 8 can also be observed from the back side of the conductive pattern substrate LP1 when the conductive pattern substrate LP1 is turned over.

Figure 6:
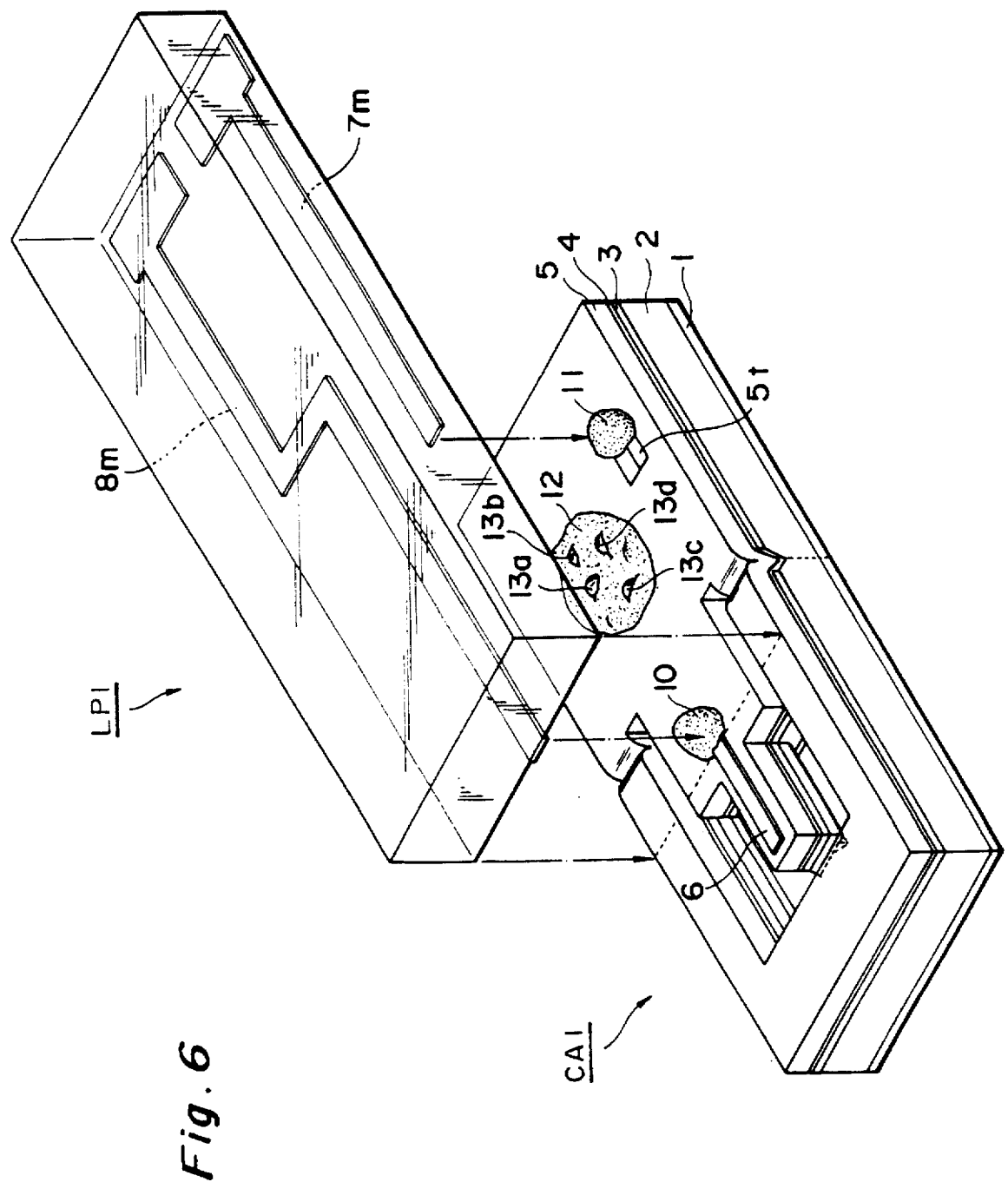
FIG. 6 is a perspective view to illustrating a step for connecting the wiring substrate to the cantilever.

FIG. 6 is a drawing for explaining a step of turning the conductive pattern substrate LP1 over and electrically connecting the electrodes 4 and 6 of the cantilever CA1 to the conductive patterns 7 and 8, respectively. A liquid conductor 10 is dropped on the upper electrode 6 of cantilever CA1. Another liquid conductor 11 is dropped through the through hole 5t onto the exposed region of the lower electrode 4. These liquid conductors 10 and 11 are liquid GaIn.

A mixture of an adhesive 12 made of an insulating material and a plurality of spacers 13a–13d made of an insulating material is applied to a region including the nearly central area of the surface of support S1 of the cantilever CA1. The adhesive 12 is made of an epoxy resin, and the spacers 13a–13d are beads made of a plastic material. Since the conductive pattern substrate LP1 has the transparent glass plate 9, the conductive pattern substrate LP1 can be adhered to the cantilever CA1 as observing the conductive patterns 7, 8 and the electrodes 4, 6 through the glass plate 9. Also, whether the conductive patterns 7 and 8 are located at predetermined positions can be checked after adhesion without removing the conductive pattern substrate LP1 from the cantilever CA1.

Figure 7:
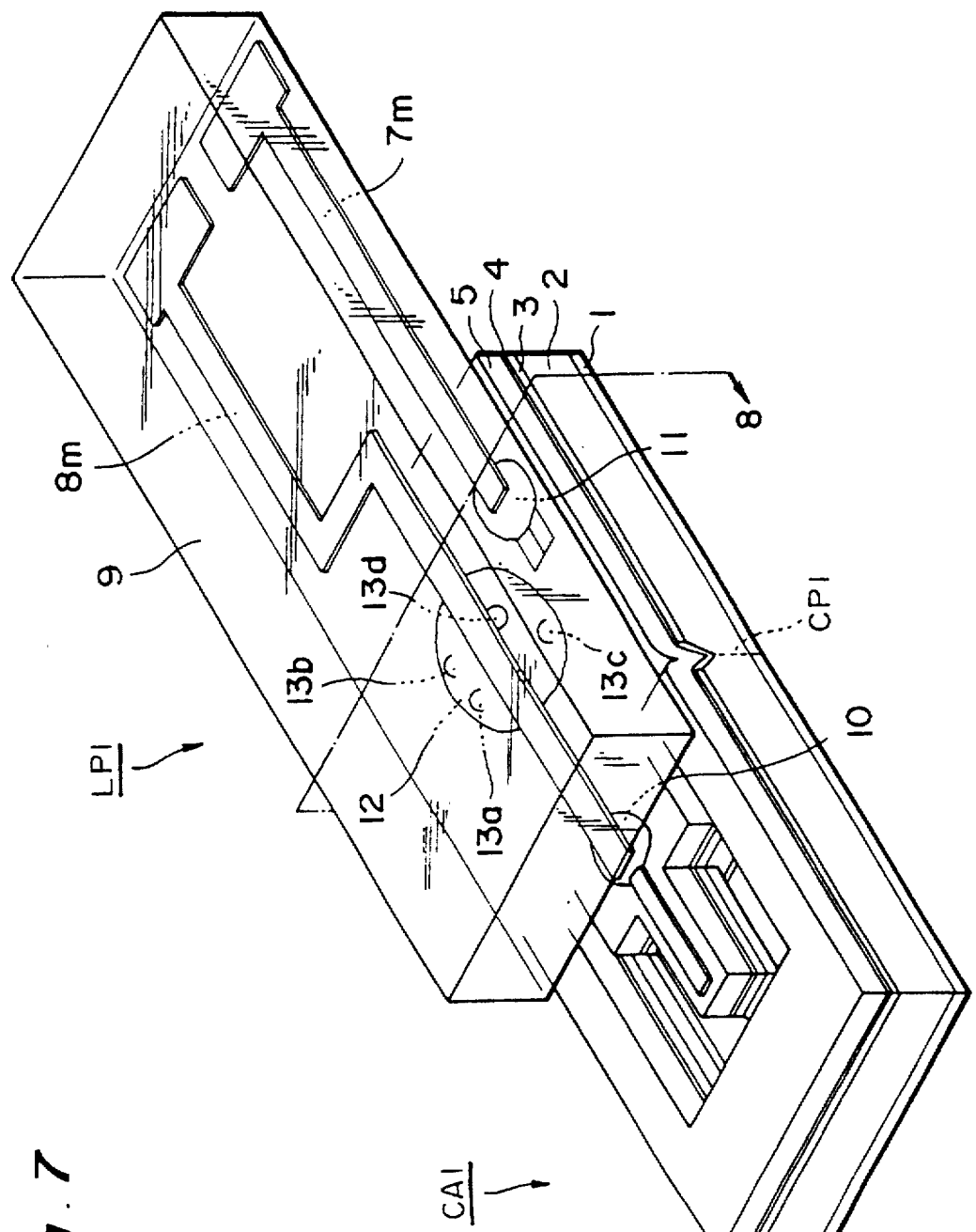
FIG. 7 is a perspective view to illustrating a step for connecting the wiring substrate to the cantilever.

FIG. 7 shows an assembly in which these conductive pattern substrate LP1 and cantilever CA1 are adhered to each other by the epoxy resin 12. The epoxy resin 12 covers only the region near the center of the surface of the support portion S1. Namely, the resin 12 is in contact with only the region on the surface of the first support portion S1 and the conductive pattern substrate LP1, and does not intersect with the plane including the cleavage plane CP1. When the protection frame FR1 is separated from the support portion S1 by making a crack along the cleavage plane CP1, the protection frame FR1 can readily be separated also from the conductive pattern substrate LP1 accordingly.

Figure 8:
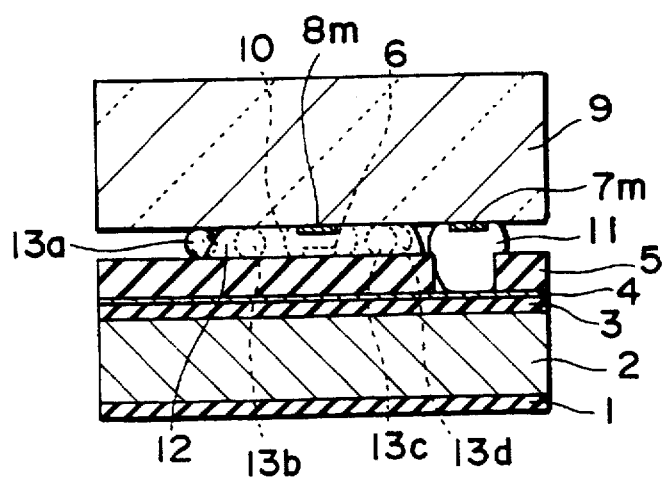
FIG. 8 is a sectional view of an assembly when the assembly of FIG. 7 is cut along arrow line 8.

FIG. 8 is a sectional view of the assembly when the assembly of FIG. 7 is cut along the arrow line 8. The beads 13a–13d are interposed between the conductive pattern substrate LP1 and the cantilever CA1, and the beads 13a–13d each have a substantially same diameter (D). The diameter D of these beads 13a–13d is greater than a value obtained by adding the thickness (t1) of the electrode layer 6 to the thickness (t2) of the electrode layer 8m. The diameter of each bead 13a–13d used upon adhesion is 8 μm, and the thickness of each of the electrode layers 7m, 8m, and 6 is 100 nm (0.1 μm). Namely, the relation of D>t1+t2 holds. Since a plane is determined by three points, the number of beads is preferably three or more.

Figure 9:
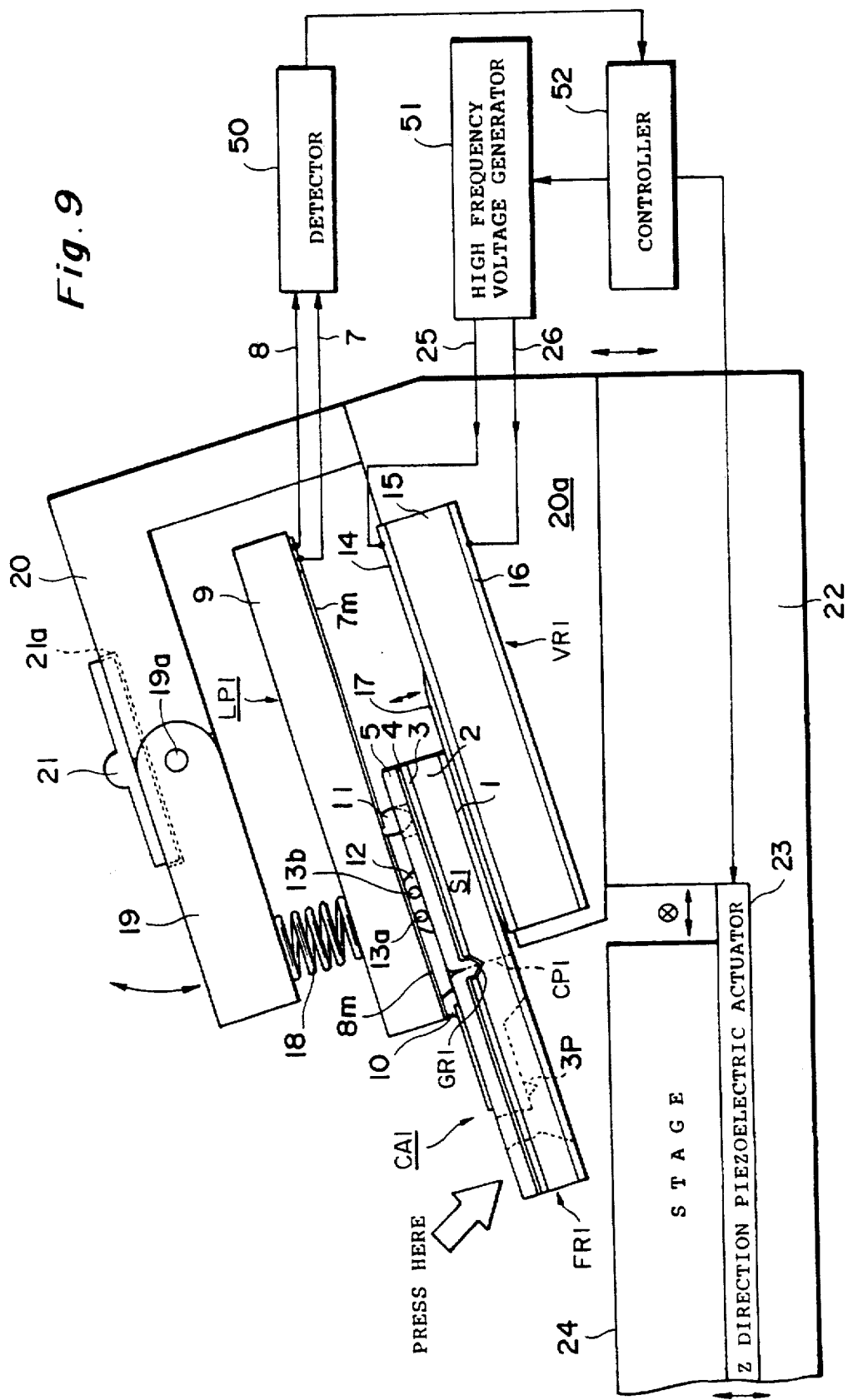
FIG. 9 is an explanatory view showing the cantilever mounted on the AFM with a protective frame.

FIG. 9 shows the cantilever CA1 fixed to the AFM. The cantilever CA1 is set on a piezoelectric vibrator VR1 provided with a piezoelectric crystal substrate 15. The piezoelectric vibrator is an element that vibrates with supply of an input voltage from the outside, and the piezoelectric vibrator VR1 has a structure in which the piezoelectric crystal substrate 15 is sandwiched between electrodes 14 and 16. Explaining the arrangement of the assembly consisting of the cantilever CA1 and the conductive pattern substrate LP1 in further detail, this assembly is set so that only the first support portion S1 is fixed to the piezoelectric vibrator VR1 by silver paste 17. Further, this assembly is energized from the top by a spring 18. Thus, this assembly is located between one end of spring 18 and the piezoelectric vibrator VR1.

The other end of the spring 18 is fixed to the bottom face of one end of a movable arm 19. A shaft 19a horizontally extending pierces the other end of the movable arm 19. The both ends of the shaft 19a are fixed to one end of a stationary arm 20. Accordingly, the movable arm 19 can rotate about the shaft 19a in a vertical plane.

A cavity 21a is formed in the shape of a rectangular parallelepiped in the top part of the movable arm 19 and stationary arm 20 as extending from inside the movable arm 19 to inside the stationary arm 20. A member 21 is set in the cavity 21a so as to be detachable from the arms 19, 20, and the member 21 has a shape just fitting the cavity 21a. Since the member 21 has the shape fit in the cavity 21a, this member 21 restrains vertical movement of the movable arm 19 when set in the cavity 21. The shaft 19a restrains horizontal movement of the movable arm 19 and this member 21 restrains vertical movement of the movable arm 19, whereby the movable arm 19 is fixed to the stationary arm 20. The natural length of the spring 18 is longer than the distance from the bottom face of the movable arm 19 to the top face of the piezoelectric vibrator VR1 when the movable arm 19 is fixed. Namely, when the movable arm 19 is fixed to the stationary arm 20, the spring 18 functions as a compression spring, so that the assembly set between the piezoelectric vibrator VR1 and the movable arm 19 is urged against the piezoelectric vibrator VR1 by the spring 18.

The stationary arm 20 is continuous to a base member 20a. A cavity is provided in the top surface of the base member 20a, and the piezoelectric vibrator VR1 is fit in this cavity. Further, the base member 20a is fixed on a base plate 22, and a drive element 23 for moving a stage 24 in the vertical direction (in the Z-direction) is set on this base plate 22. The drive element 23 is a piezoelectric actuator made of a piezoelectric crystal material such as PZT.

The piezoelectric crystal substrate 15 of the piezoelectric vibrator VR1 is made of a ceramic material, and the electrodes 14 and 16 are made of silver (Ag). For vibrating this vibrator VR1, an AC voltage is applied between the electrodes 14 and 16 at the frequency equal to the natural frequency of a vibrating portion composed of the vibrator VR1 and the assembly.

This AC voltage is supplied between these electrodes 14 and 16 via conductor lines 25 and 26, respectively, from a high-frequency voltage generator 51. Instead of using the high-frequency voltage generator 51, the ceramic vibrator VR1 may be arranged to form a part of a positive feedback oscillator. For example, the vibrator VR1 may be constructed in such a manner that the ceramic vibrator VR1 is used as a coil of a Colpitts oscillator (not shown). In further detail, the Colpitts oscillator is composed of a CMOS inverter not shown, the vibrator VR1 connected through the electrodes 14 and 16 between the input and output terminals of the CMOS inverter, a bias resistance not shown, connected between the input and output terminals of the CMOS inverter, a limiting resistance not shown, interposed between the output terminal of the CMOS inverter and the electrode 16, a first capacitor not shown, interposed between the electrode 14 and the ground, and a second capacitor not shown, interposed between the electrode 16 and the ground.

After the cantilever CA1 is set in the AFM, a pressure is applied to the top face of the protection frame FR1 by the tip of a finger or tweezers. Instead of applying the pressure on the top face of the protection frame FR1, the tweezers may be used to pinch the protection frame FR1 and to move it up or down. Since the groove GR1 is formed between the protection frame FR1 and the first support portion S1, application of the pressure on the protection frame FR1 results in splitting the cantilever CA1 at the border of the cleavage plane CP1 of the single crystal layer 2. The protection frame FR1 can be readily separated from the support portion S1 on this occasion, because the adhesive 12 is interposed only between the first support portion S1 and the conductive pattern substrate LP1.

Figure 10:
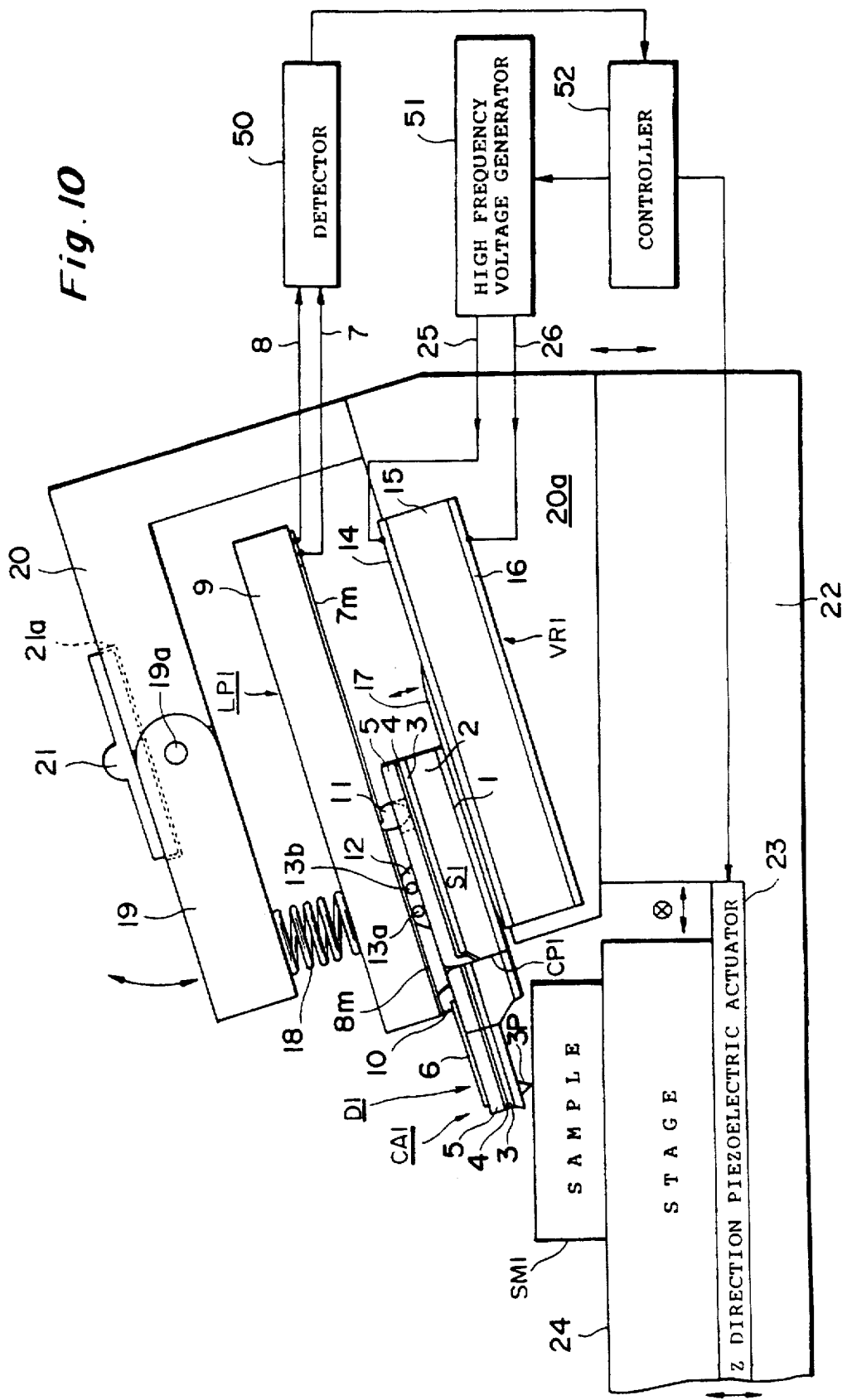
FIG. 10 is an explanatory view showing the cantilever mounted on the AFM with a protective frame removed.

FIG. 10 shows the AFM provided with the cantilever CA1 from which the protection frame FR1 is removed. A sample SM1 is placed on the stage 24. A controller 52 controls the high-frequency voltage generator 51 so as to vibrate the vibrator VR1. When the vibrator VR1 vibrates, the cantilever CA1 also vibrates to vibrate the flexible portion D1. The vibration of the flexible portion D1 generates an AC voltage between the electrode 6 and the electrode 4 of the cantilever. This AC voltage is detected through the conductive line 7 and conductive line 8 by the detector 50. When the probe 3p of the cantilever CA1 is set in the vicinity of the surface of sample SM1, an interatomic force acts between the probe 3p and the surface of sample SM1, which force changes the AC voltage detected by the detector 50. The surface of sample SM1 is scanned by the probe 3p of the cantilever CA1. This scanning is effected by moving the sample SM1 relative to the cantilever CA1. Alternatively, this scanning may be effected by moving the cantilever CA1 relative to the sample SM1. The controller 52 drives the Z-direction piezoelectric actuator 23 so that the scanning may not change the AC voltage detected by the detector 50. A change of this AC voltage is dependent upon the distance between the probe 3p and the surface of sample SM1. Namely, the sample SM1 set on the stage 24 is displaced in the Z-direction by the Z-direction piezoelectric actuator 23 so as to keep the distance between the surface of sample SM1 and the probe 3p always constant. An amount of displacement of the Z-direction actuator 23 depends upon the voltage supplied from the controller 52 to the actuator 23. Therefore, the configuration of the surface of sample SM1 can be measured by monitoring the voltage supplied to the actuator 23 by the controller 52 upon the above scanning.

Figure 11:
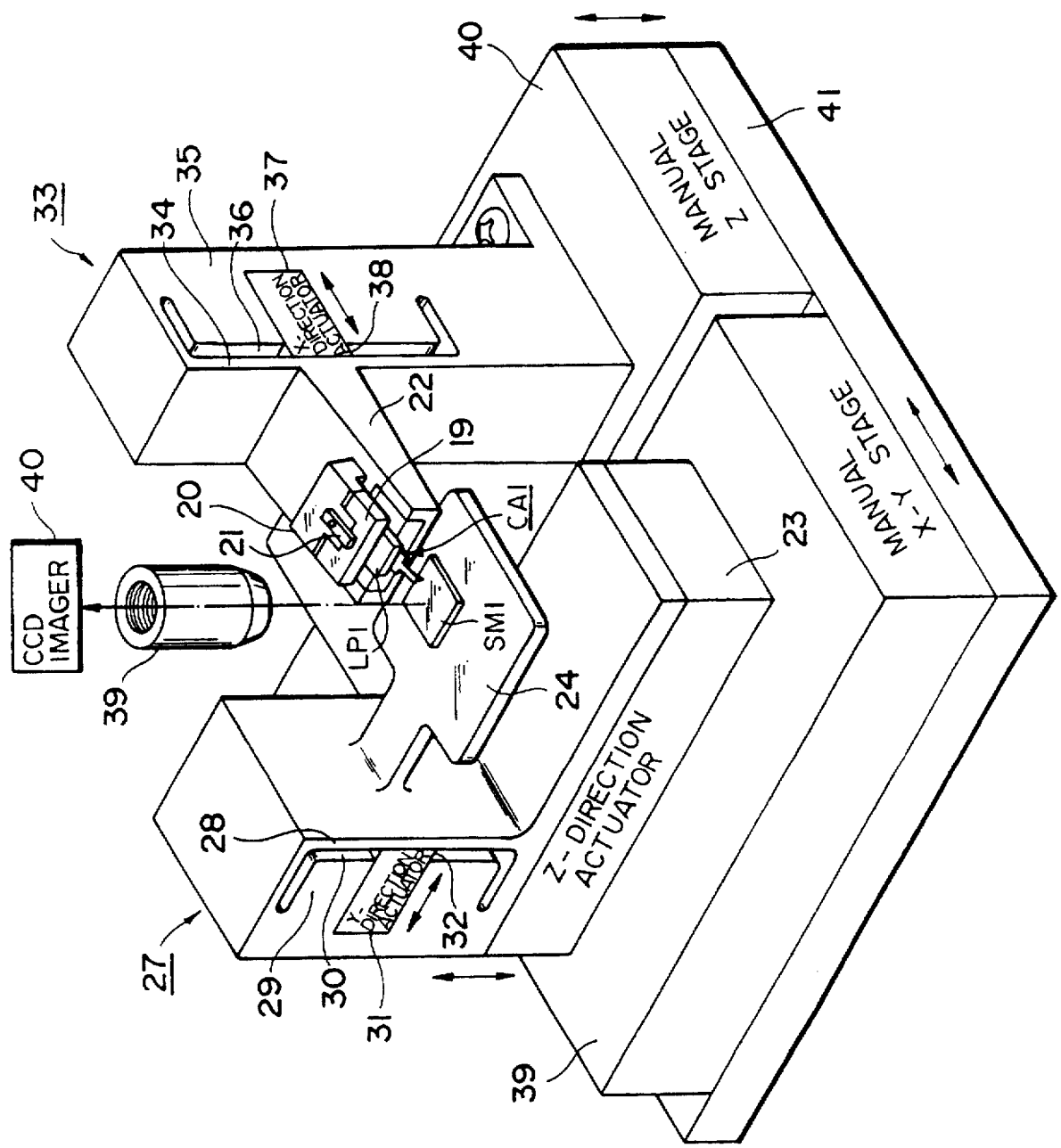
FIG. 11 is a perspective explanatory view showing the cantilever mounted on the AFM with a protective frame removed.

FIG. 11 shows a scanning system of the AFM. In the following description, the Z-direction indicates the vertical direction, and the X-direction, Y-direction, and Z-direction are perpendicular to each other.

As described above, the stage 24 is moved up and down by the Z-direction actuator 23. The Z-direction actuator 23 is placed on a manual X-Y stage 39. For roughly moving the sample SM1, manual stages 39 and 40 are moved. The Z-direction actuator 23 is moved in the horizontal plane by the manual X-Y stage 39. The cantilever CA1 is moved in the Z-direction by the manual Z-stage 40. These manual stages 39 and 40 are mounted on a common base plate 41.

A Y-direction drive mechanism 27 is fixed on the Z-direction piezoelectric actuator 23. The Y-direction drive mechanism 27 is set in a space 31 formed in the main body 29, and has a Y-direction piezoelectric actuator 32 which, can expand in the Y-direction with application of a voltage thereto. The both ends of a plate spring portion 28 are continuous from the main body 29. The plate spring portion 28 has a predetermined clearance 30 to the main body 29 except for the both ends thereof. The Y-direction piezoelectric actuator 32 extends from the inside of the main body 29 toward the inner surface of the flexible plate 28 to contact the inner surface. The stage 24 is fixed to the outer surface of the flexible plate 28, and the sample SM1 can be moved in the Y-direction with application of a voltage to the Y-direction piezoelectric actuator 32.

An X-direction drive mechanism 33 is fixed on the manual Z-direction stage 40. The X-direction drive mechanism 33 is set in a space 37 formed in the main body 35, and has an X-direction piezoelectric actuator 38 which can expand in the X-direction with application of a voltage thereto. The both ends of a plate spring portion 34 are continuous from the main body 35. The plate spring portion 34 has a predetermined clearance 36 to the main body 35 except for the both ends thereof. The X-direction piezoelectric actuator 38 extends from the inside of the main body 35 toward the inner surface of the flexible plate 34 to contact with the inner surface. A base 22 is fixed to the outer surface of the flexible plate 34, and the cantilever CA1 can be moved in the X-direction with application of a voltage to the actuator 37.

An image of sample SM1 can be taken through an objective lens 39 set above the stage 24 by a charge coupled image sensor (CCD) 40.

Figure 12:
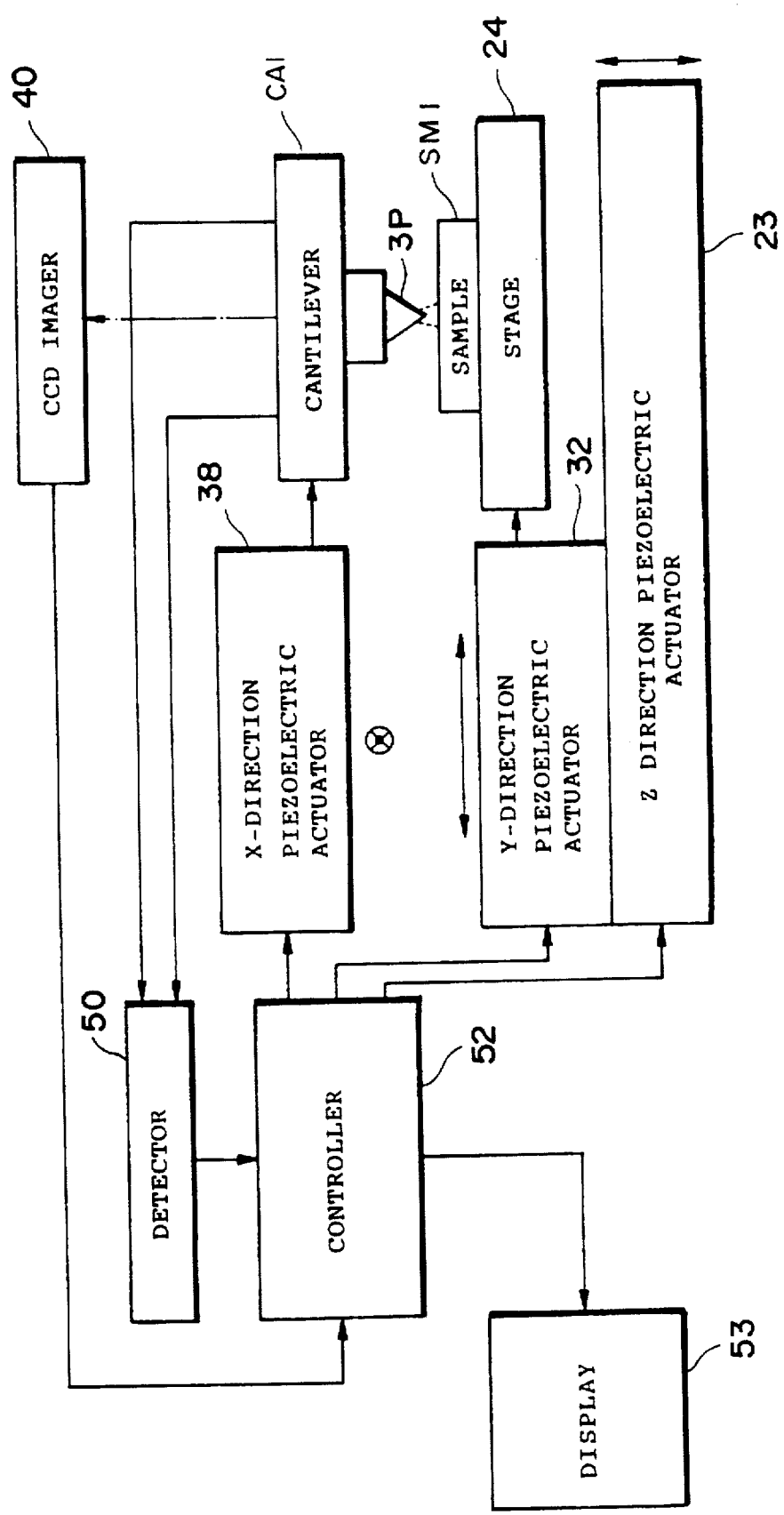
FIG. 12 is a block diagram to show a system layout of the AFM.

FIG. 12 is a block diagram to show a setup of the scanning system. The interatomic force acting between the probe 3p and the sample SM1 is detected as a voltage by the detector 50, and the controller 52 controls the Z-direction piezoelectric actuator 23 so as to keep the voltage detected constant. Further, the controller 52 indicates the voltage applied to the Z-direction piezoelectric actuator 23 on a display 53. The controller 52 controls the piezoelectric scanning systems 32 and 38 so as to scan the surface of sample SM1 with the probe 3p of the cantilever CA1. Accordingly, the display 53 indicates the configuration of the surface of sample SM1. Further, the controller 52 has a memory for storing measurement coordinates of the surface of sample SM1 and displacement data of the surface of sample SM1 at the coordinates inside thereof, and the controller 52 outputs three-dimensional image data of the surface of sample SM1, based on the coordinate data and displacement data. Thus, the display 53 can indicate the three-dimensional image of the surface of sample SM1. An image signal from the CCD image sensor 40 is input into the controller 52, and an image of sample SM1 can also be indicated on the display 53.

A second embodiment of a cantilever CA2 is next explained, omitting redundant portions as explained in the description of the first cantilever CA1.

Figure 13:
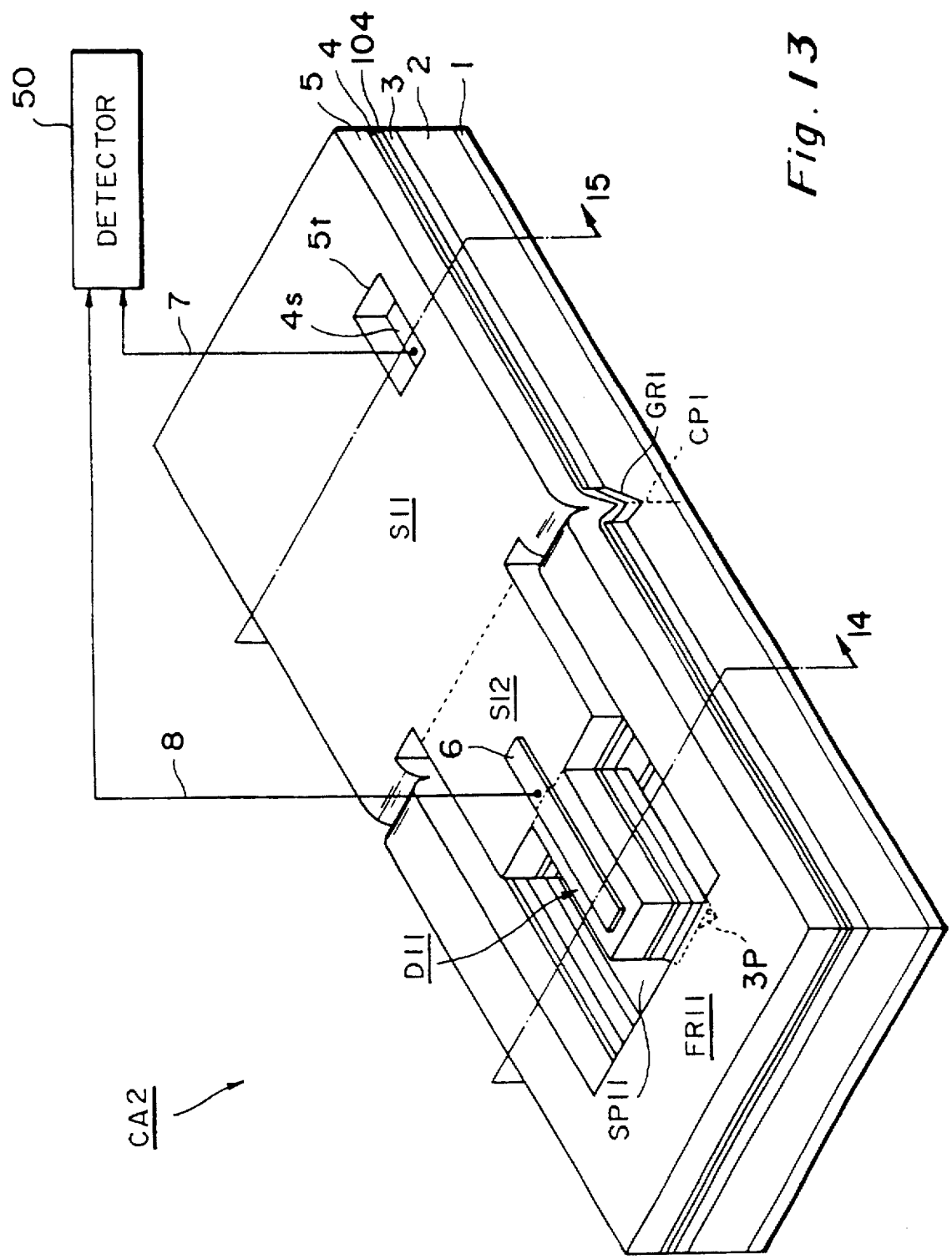
FIG. 13 is a perspective view of a second embodiment of a cantilever.

FIG. 13 is a perspective view of the second cantilever CA2. This cantilever CA2 has the first support portion S11, the second support portion S12, the flexible portion D11, and the protection frame FR11. The second cantilever CA2 is different from the first cantilever CA1 in that a tantalum (Ta) electrode layer 104 is disposed between the platinum electrode layer 4 and the silicon nitride layer 3. The other structure of the second cantilever CA2 is the same as that of the first cantilever CA1.

Figure 14:
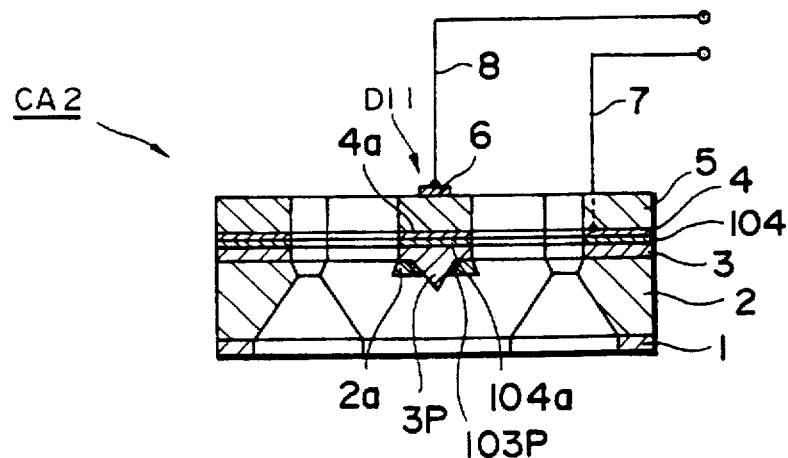
FIG. 14 is a sectional view of the cantilever when the cantilever of FIG. 13 is cut along arrow line 14.

FIG. 14 is a sectional view of the cantilever when the cantilever CA2 of FIG. 13 is cut along arrow line 14. The tantalum electrode layer 104 is in contact with the entire bottom face of the platinum electrode layer 4, and the tantalum layer 104a of the flexible portion D11 of the cantilever CA2 is opposed together with the lower platinum layer 4a to the upper platinum layer 6. The probe 3p of silicon nitride is formed in the shape of a rectangular pyramid on the bottom surface of the flexible portion D11 of the second cantilever CA2, and a silicon dioxide layer 103p, which covers portions other than the portion near the tip of the outer surfaces of the pyramid 3p, interposed between the silicon 2a and the probe 3p.

Figure 15:
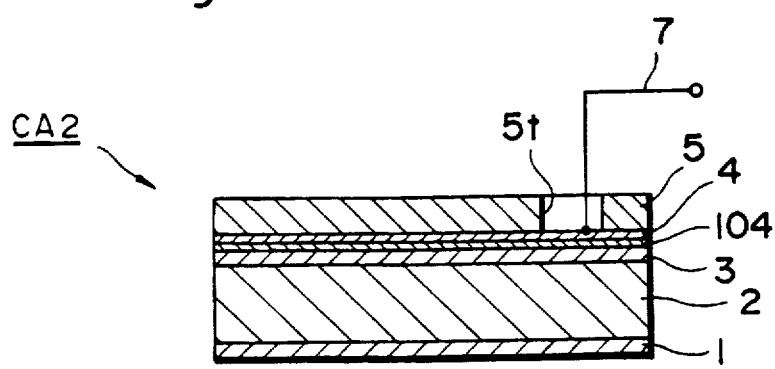
FIG. 15 is a sectional view of the cantilever when the cantilever of FIG. 13 is cut along arrow line 15.

FIG. 15 is a sectional view of the cantilever when the cantilever CA2 of FIG. 13 is cut along arrow line 15. The tantalum electrode layer 104 is electrically connected to the platinum electrode layer 4, and the conductor line 7 is electrically connected to the platinum electrode layer 4.

A process for fabricating the second cantilever CA2 is next explained referring to FIG. 16 to FIG. 52.

Figure 16:
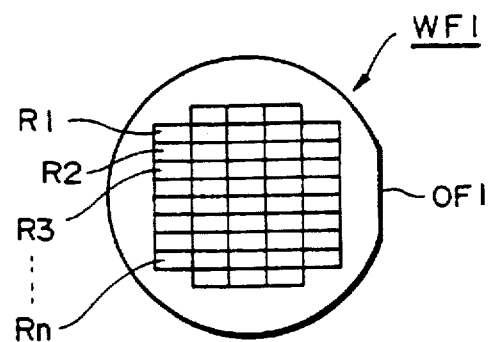
FIG. 16 is a plan view of a wafer having a plurality of cantilevers to be formed.

FIG. 16 is a plan view of a silicon wafer WF1. The wafer WF1 is an n-type Si (100) wafer having the diameter of 3 inches and the thickness of 0.38 mm. A plurality of cantilever forming regions $R_1, R_2, \ldots, R_n$ are set in the wafer WF1. Here, the longitudinal direction (the X-direction) of each cantilever forming region $R_1, R_2, \ldots, R_n$ is perpendicular to the orientation flat OF1 of the wafer WF1. The following description concerns the process for fabricating the cantilever CA2 formed in the region $R_1$, but cantilevers having the same structure as the cantilever CA2 are also fabricated at the same time as the fabrication of this cantilever CA2 in the remaining regions using the same fabrication process as this fabrication process. Since a cantilever with piezoelectric thin-film sensor has a high value added and if a lot of cantilevers are formed in a same wafer as in this case, the fabrication cost per cantilever can be decreased.

FIG. 17 is a plan view of a cantilever intermediate, and FIG. 18 is a sectional view of the cantilever intermediate when the cantilever intermediate of FIG. 17 is cut along arrow line 18—18. First, the silicon nitride layers 1 and 3 are formed in the thickness 100 nm on the top surface and on the bottom surface of wafer WF1, using the chemical vapor deposition (CVD) process. In other words, the silicon nitride layers 1 and 3 are formed on the upper surface and the lower surface of the Si substrate or layer 2, using the CVD process. Next, a photosensitive material (photoresist) PM1 is applied onto the upper silicon nitride layer 3. The application process of the photoresist PM1 includes a step of dropping a photoresist material onto the silicon nitride layer 3, and a step of rotating the wafer WF1 by a spinner (not shown) to equalize the thickness of the material on the wafer WF1. The photoresist PM1 may be either one of negative type and positive type resists. In this example a negative type photoresist is used. The negative type photoresist is an organic material that is sensitive to light of short wavelengths, particularly to light of wavelengths in the ultraviolet region, and which solidifies by irradiation with the light. After the photoresist PM1 is applied over the upper silicon nitride layer 3, the region other than the region where the probe is to be formed is irradiated with light, using a mask or reticle (not shown). The region where the probe is to be formed is square. After that, the cantilever intermediate coated with the resist PM1 is baked to completely solidify the resist PM1 in the region other than the region where the probe is to be formed. After that, the resist PM1 in the region where the probe is to be formed is etched with an organic solvent, thereby removing the resist from the silicon nitride layer 3. Namely, a through hole TH1 is formed in the region 3 where the probe is to be formed. Similarly as this forming process of the photoresist pattern, all forming processes of photoresist pattern as described below include the application, exposure, baking, and etching steps of photoresist unless otherwise stated specifically, and each is defined as a process for forming a desired pattern by these steps.

FIG. 19 is a plan view of a cantilever intermediate, and FIG. 20 is a sectional view of the cantilever intermediate when the cantilever intermediate of FIG. 19 is cut along arrow line 20—20. After formation of the through hole TH1, the exposed region (the region where the probe is to be formed) of the silicon nitride layer 3 is removed from the silicon layer 2 by the reactive ion beam etching (RIE) process using the photoresist layer PM1 as a mask, thereby forming a through hole TH2 aligned with the through hole TH1. Then the photoresist PM1 over the entire region is removed with an organic solvent from the silicon nitride layer 3.

FIG. 21 is a plan view of a cantilever intermediate, and FIG. 22 is a sectional view of the cantilever intermediate when the cantilever intermediate of FIG. 21 is cut along arrow line 22—22. After the through hole TH2 is formed in the silicon nitride layer 3, the inside of the probe forming region of silicon layer 2 is wet-etched using the silicon nitride layer 3 as a mask. The anisotropic etching process is used for this etching. An etchant (etching solution) for this etching is a potassium hydroxide (KOH) solution. This etching process self-stops, thereby forming an etch pit EP having a square opening edge. The etch pit EP has the shape of an inverted rectangular pyramid defined by four side faces. One of these four side faces is the (111) plane, and the other three faces are planes equivalently symmetric therewith. Each plane is inclined 54.7° downward from the surface of silicon layer 2, that is, from the (100) plane.

Figure 23:
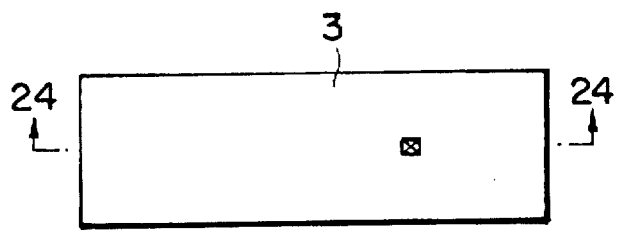
FIG. 23 is a plan view of a cantilever intermediate.
Figure 24:
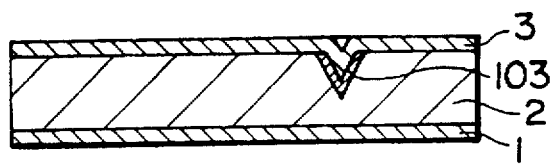
FIG. 24 is a sectional view of the cantilever intermediate when the cantilever intermediate of FIG. 23 is cut along arrow line 24—24.

FIG. 23 is a plan view of a cantilever intermediate, and FIG. 24 is a sectional view of the cantilever intermediate when the cantilever intermediate of FIG. 23 is cut along arrow line 24—24. After formation of the etch pit EP, the silicon dioxide layer 103 is formed by thermal oxidation of silicon in this region. Namely, the exposed surface of Si inside the etch pit EP is oxidized by thermal oxidation to form the probe 103 of silicon dioxide. When a starting material is the (100) Si wafer WF1, the cantilever intermediate is desirably heated at the temperature of not less than 700° C. in an oxygen atmosphere. The thickness of the oxide layer 103 is 1 μm. After the thermal oxidation, the silicon nitride layer is formed on the oxide layer 103 by the CVD process to increase the thickness of the silicon nitride layer 3. The thickness of the silicon nitride layer 3 becomes 500 μm. Here, the silicon nitride layer 3 may be formed on the oxide layer 103 by the sputtering process using the silicon nitride substrate not shown as a target, instead of the CVD process.

Figure 25:
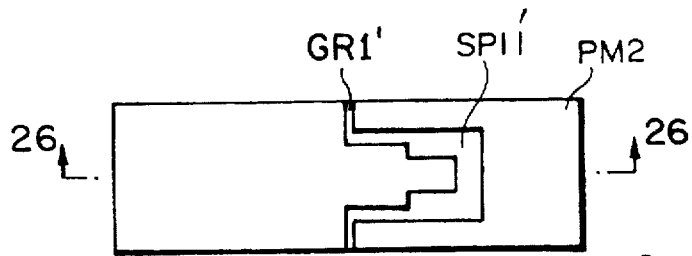
FIG. 25 is a plan view of a cantilever intermediate.
Figure 26:
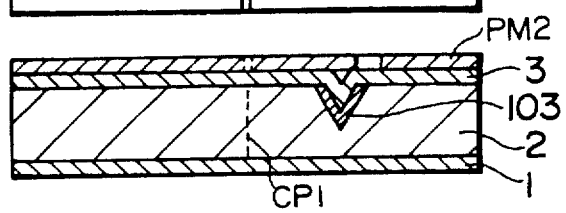
FIG. 26 is a sectional view of the cantilever intermediate when the cantilever intermediate of FIG. 25 is cut along arrow line 26—26.

FIG. 25 is a plan view of a cantilever intermediate, and FIG. 26 is a sectional view of the cantilever intermediate when the cantilever intermediate of FIG. 25 is cut along arrow line 26—26. After formation of the coating film 103, a photoresist pattern PM2 is formed by the same process as described above in the region corresponding to the first support portion S11, the second support portion S12, the flexible portion D11, and the protection frame FR11 on the silicon nitride layer 3. Namely, the photoresist is removed from the region SP11' corresponding to the clearance SP11 of the cantilever CA2 and from the region GR1' corresponding to the groove GR1, so that surfaces of the silicon nitride layer 3 in the corresponding regions are exposed.

Figure 27:
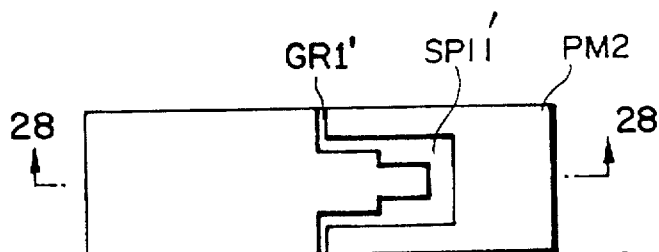
FIG. 27 is a plan view of a cantilever intermediate.
Figure 28:
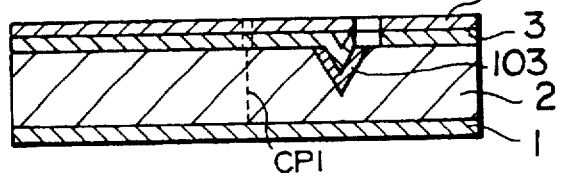
FIG. 28 is a sectional view of the cantilever intermediate when the cantilever intermediate of FIG. 27 is cut along arrow line 28—28.

FIG. 27 is a plan view of a cantilever intermediate, and FIG. 28 is a sectional view of the cantilever intermediate when the cantilever intermediate of FIG. 27 is cut along arrow line 28—28. The silicon nitride layer 3 inside the regions SP11' and GR1', i.e., inside the exposed regions SP11' and GR1' of the silicon nitride layer 3, is removed from the silicon layer 2 by the RIE process, thus exposing the silicon layer 2 inside the regions SP11' and GR1'.

FIG. 29 is a plan view to show the back side of a cantilever intermediate, and FIG. 30 is a sectional view of the cantilever intermediate when the cantilever intermediate of FIG. 29 is cut along arrow line 30—30. A photoresist pattern PM3 is formed in regions of the back side opposed to the regions other than the region SP11' of the front face. Namely, the photoresist is removed from a region SP111 opposed to the region SP11' of the front face.

FIG. 31 is a plan view to show the back side of a cantilever intermediate, and FIG. 32 is a sectional view of the cantilever intermediate when the cantilever intermediate of FIG. 31 is cut along arrow line 32—32. After formation of the photoresist pattern PM3, the silicon nitride layer 1 inside the predetermined region SP111 on the back side is removed from the silicon layer 2 by the RIE process using the resist pattern PM3 as a mask.

FIG. 33 is a plan view of a cantilever intermediate, and FIG. 34 is a sectional view of the cantilever intermediate when the cantilever intermediate of FIG. 33 is cut along arrow line 34—34. After a part of the silicon nitride layer 1 on the back side is removed, the photoresists PM2 and PM3 adhering to the front side surface and the back side surface are removed with an organic solvent.

Figure 35:
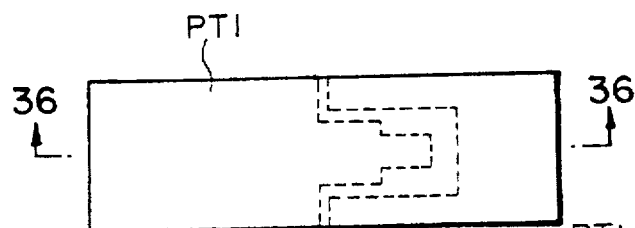
FIG. 35 is a plan view of a cantilever intermediate.
Figure 36:
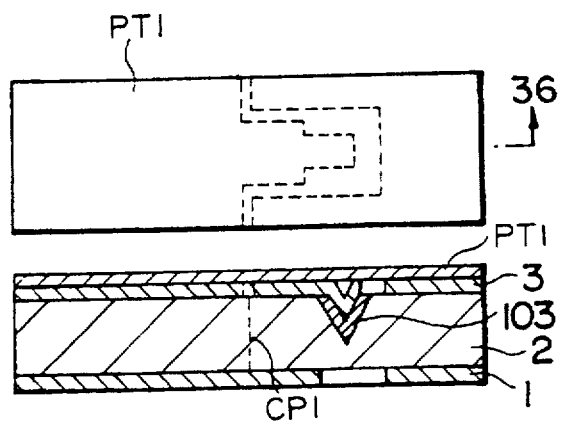
FIG. 36 is a sectional view of the cantilever intermediate when the cantilever intermediate of FIG. 35 is cut along arrow line 36—36.

FIG. 35 is a plan view of a cantilever intermediate, and FIG. 36 is a sectional view of the cantilever intermediate when the cantilever intermediate of FIG. 35 is cut along arrow line 36—36. After removing the photoresists PM2 and PM3, a protection tape PT1 is put on the upper silicon nitride layer 3. The protection tape PT1 protects the surface of the silicon nitride layer 3 during etching. The protection tape (film) PT1 is a UV tape available from Furukawa Denko Co., which is a tape readily peelable from an object after irradiated with ultraviolet light (for example, of 248 nm). The tape of this type is composed of a tape made of a material selected from polyolefin-based and polyfluoroolefin-based materials, and a photo-curable pressure-sensitive adhesive in contact with the tape. The photo-curable pressure-sensitive adhesive is obtained by mixing a tackifier and a photopolymerization initiator in a normal polyolefin oligomer or monomer.

Figure 37:
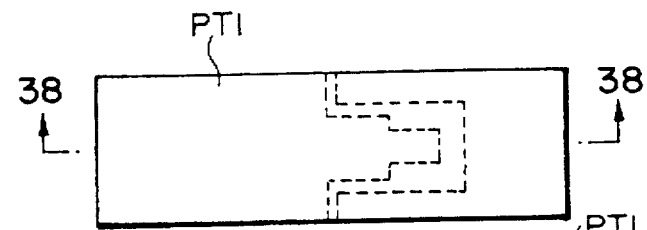
FIG. 37 is a plan view of a cantilever intermediate.
Figure 38:
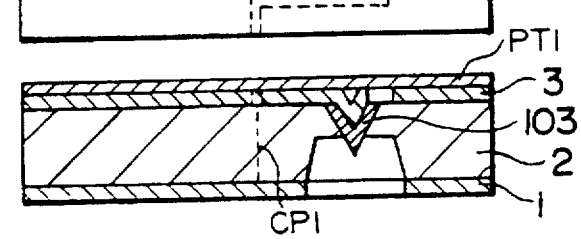
FIG. 38 is a sectional view of the cantilever intermediate when the cantilever intermediate of FIG. 37 is cut along arrow line 38—38.

FIG. 37 is a plan view of a cantilever intermediate, and FIG. 38 is a sectional view of the cantilever intermediate when the cantilever intermediate of FIG. 37 is cut along arrow line 38—38. After the protection tape PT1 is put on, the silicon layer 2 is etched with a mask of the silicon nitride layer 1 on the back side face. The etchant is a potassium hydroxide solution in the concentration of 40%. The temperature of the etchant is 90° C. and the period of etching is 200 minutes. The silicon layer 2 is anisotropically etched from the back side into the depth of 330 μm by this etching process.

Figure 39:
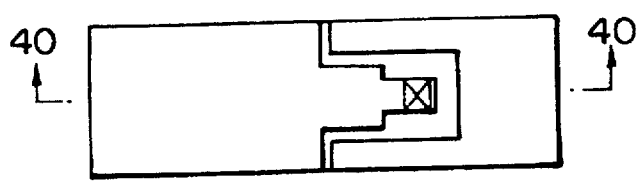
FIG. 39 is a plan view of a cantilever intermediate.
Figure 40:
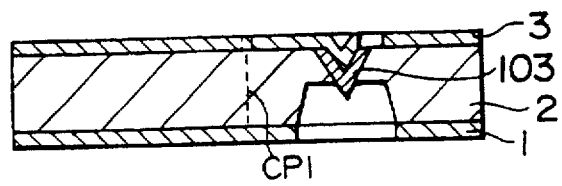
FIG. 40 is a sectional view of the cantilever intermediate when the cantilever intermediate of FIG. 39 is cut along arrow line 40—40.

FIG. 39 is a plan view of a cantilever intermediate, and FIG. 40 is a sectional view of the cantilever intermediate when the cantilever intermediate of FIG. 39 is cut along arrow line 40—40. After the back etching of the silicon layer 2, the protection tape PT1 is irradiated with ultraviolet light, and the tape PT1 is peeled off.

Figure 41:
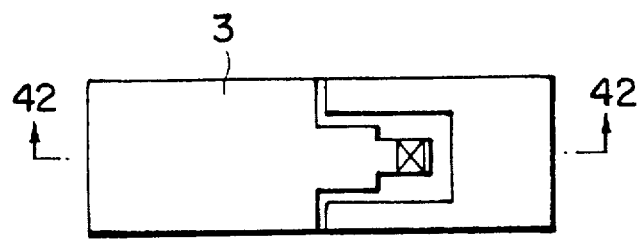
FIG. 41 is a plan view of a cantilever intermediate.
Figure 42:
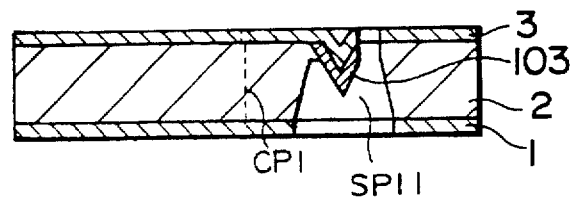
FIG. 42 is a sectional view of the cantilever intermediate when the cantilever intermediate of FIG. 41 is cut along arrow line 42—42.

FIG. 41 is a plan view of a cantilever intermediate, and FIG. 42 is a sectional view of the cantilever intermediate when the cantilever intermediate of FIG. 41 is cut along arrow line 42—42. After removing the tape PT1, the silicon layer 2 is etched with a mask of the silicon nitride layers 1 and 3 on the front side face and the back side face. The etchant is a potassium hydroxide solution in the concentration of 40%. The temperature of the etchant is 90° C., and the period of etching is 30 minutes. This anisotropic etching forms the groove GR1 and the space SP1 piercing the silicon layer 2 from the back side face to the front side face thereof.

Figure 43:
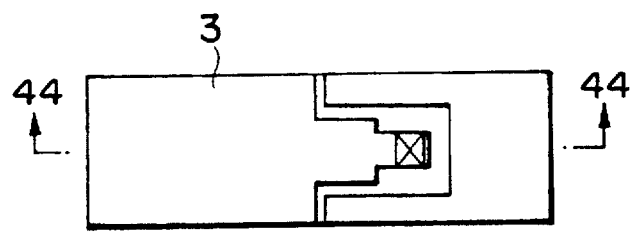
FIG. 43 is a plan view of a cantilever intermediate.
Figure 44:
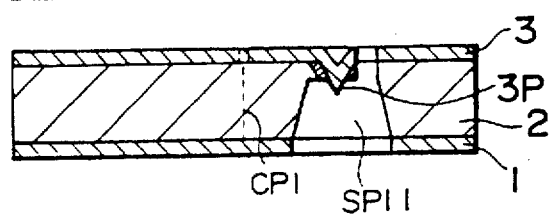
FIG. 44 is a sectional view of the cantilever intermediate when the cantilever intermediate of FIG. 43 is cut along arrow line 44—44.

FIG. 43 is a plan view of a cantilever intermediate, and FIG. 44 is a sectional view of the cantilever intermediate when the cantilever intermediate of FIG. 43 is cut along arrow line 44—44. After formation of the space SP11, the tip portion of the silicon dioxide film 103 formed on the surface of probe 3p is etched to expose the probe 3p projecting from the silicon dioxide layer 103p left. The etchant is a buffer solution in which 50% HF solution and 40% $NH_4F$ solution are mixed at the ratio of 1:10. Namely, this etchant is a buffered oxide etchant (BOE).

Figure 46:
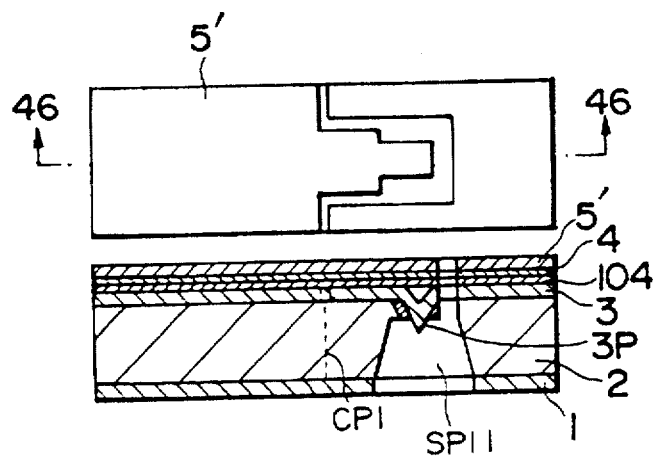
FIG. 46 is a sectional view of the cantilever intermediate when the cantilever intermediate of FIG. 45 is cut along arrow line 46—46.

FIG. 45 is a plan view of a cantilever intermediate, and FIG. 46 is a sectional view of the cantilever intermediate when the cantilever intermediate of FIG. 45 is cut along arrow line 46—46. After the silicon dioxide film 103 is etched, the tantalum (Ta) electrode layer 104 is deposited on the silicon nitride layer 3 by the RF sputtering process. The thickness of the tantalum electrode layer 104 is 100 nm. In this process, the temperature of the substrate 2 is 400° C. Next, the platinum (Pt) electrode layer 4 is formed on the tantalum electrode layer 104 by the sputtering process. The thickness of the platinum electrode layer 4 is 100 nm. Further, the PZT layer 5' is formed on the platinum (Pt) electrode layer 4 by the sputtering process using Au-Ni/SUS plate 304 as a mask. The thickness of the PZT layer 5' is 1 μm.

FIG. 47 is a plan view of a cantilever intermediate, and FIG. 48 is a sectional view of the cantilever intermediate when the cantilever intermediate of FIG. 47 is cut along arrow line 48—48. After formation of the PZT layer 5', the PZT layer 5' is annealed in air, thereby forming the PZT layer 5 polarized. The annealing temperature is 650° C.

FIG. 49 is a plan view of a cantilever intermediate, and FIG. 50 is a sectional view of the cantilever intermediate when the cantilever intermediate of FIG. 49 is cut along arrow line 50—50. After the annealing of the PZT layer 5', a photoresist pattern (not shown) is formed for forming the upper electrode layer 6. Using this photoresist as a mask, the upper electrode layer 6 is formed on a region including the border between the flexible portion D11 and the second support portion D12, thus forming the cantilever CA2 shown in FIG. 13. The thickness of the upper electrode layer 6 is 100 nm. After the formation of the upper electrode layer 6, the photoresist is removed from the PZT layer 5 with an organic solvent.

FIG. 51 is a plan view of an assembly consisting of the cantilever CA2 and the conductive pattern substrate LP1, and FIG. 52 is a sectional view of the assembly when the assembly of FIG. 51 is cut along arrow line 52—52. The structure of the conductive pattern substrate LP1 is shown in FIG. 5. The connection and adhesion methods between the cantilever CA2 and the conductive pattern LP1 are the same as those between the cantilever CA1 and the conductive pattern substrate LP1.

Figure 53:
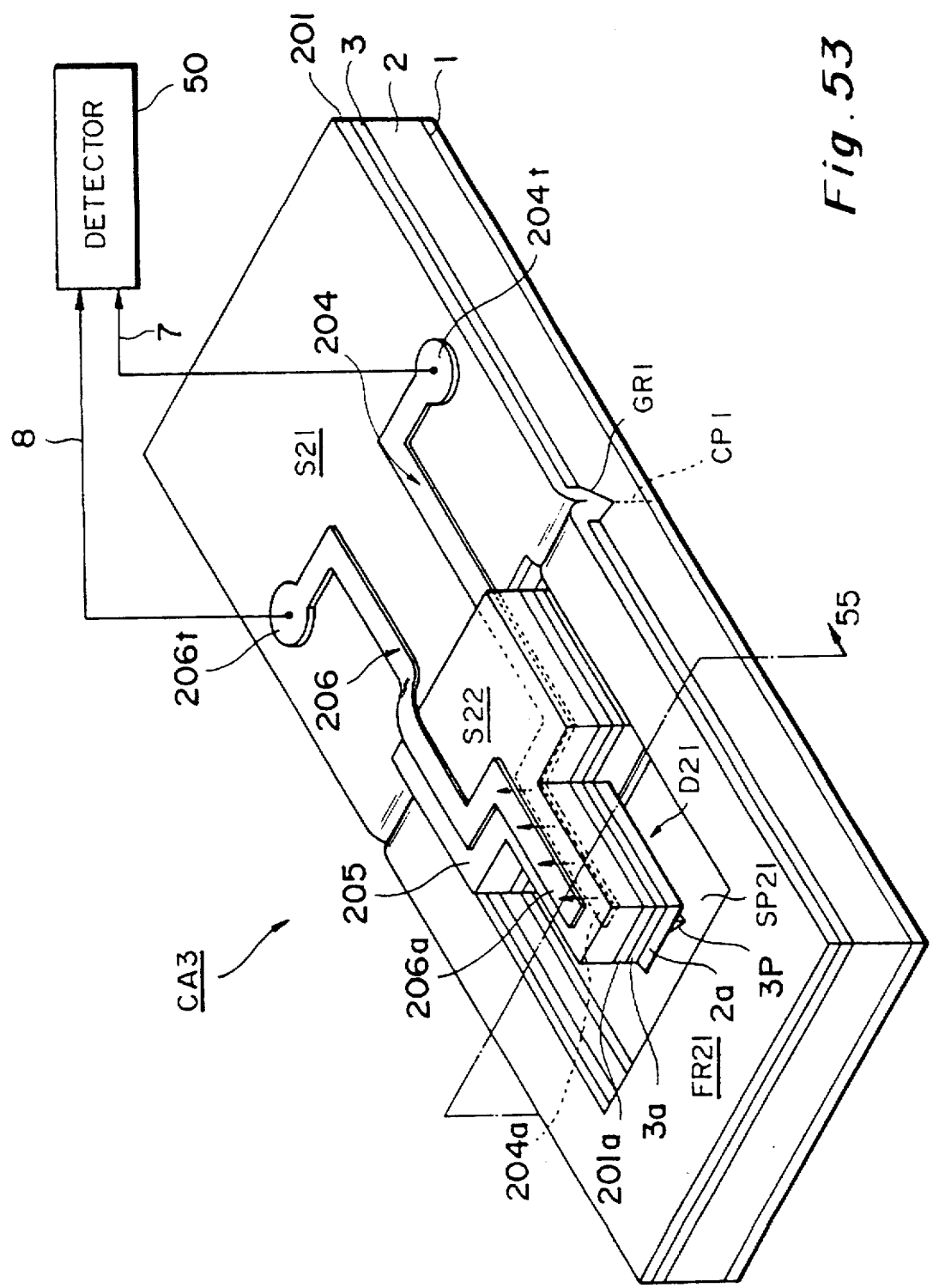
FIG. 53 is a perspective view of a third embodiment of a cantilever.

The third embodiment of a cantilever CA3 is next explained. FIG. 53 shows the third cantilever CA3. This cantilever CA3 has the first support portion S21, the second support portion S22, the flexible portion D21, and the protection frame FR21, and a space SP21 filled with air is interposed between the protection frame FR21 and the flexible portion D21 and second support portion S22. Further, the cantilever CA3 has the insulating layer 1 of silicon nitride, the semiconductor layer 2 of silicon, the insulating layer 3 of silicon nitride, an insulating layer 201 of magnesium oxide (MgO), a lower electrode layer 204 of Pt, a piezoelectric layer 205 of PZT, and an upper electrode layer 206 of Pt, as laminated in order. The piezoelectric layer 205 is formed only on the top faces of the flexible portion D21 and second flexible portion S22, and this piezoelectric thin film 205 can be bent together with the electrodes 204 and 206. The MgO layer 201 is interposed between the silicon nitride layer 3 and the PZT layer 205, and functions as a buffer layer for preventing an undesired reaction from taking place between these layers 3 and 205. In the second support portion S22, the lower electrode 204 and upper electrode 206 are opposed to each other near the region including the border between the second support portion S22 and the flexible portion D21, but are not opposed to each other in the other regions. The lower electrode 204 has a terminal 204t, which is electrically connected with the conductor line 7. The upper electrode 206 has a terminal 206t, which is electrically connected with the conductor line 8.

Figure 54:
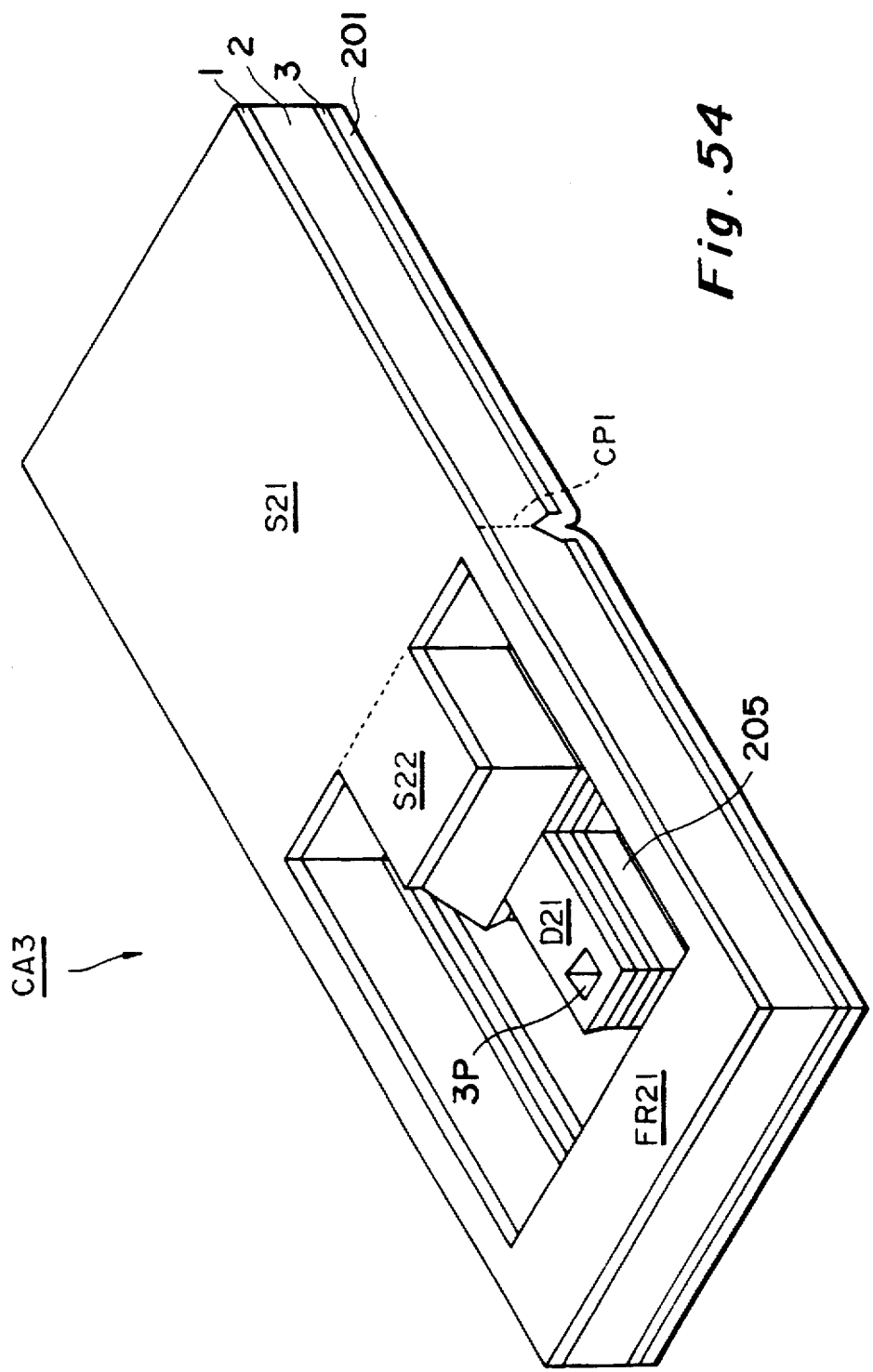
FIG. 54 is a perspective view of the back side of the cantilever shown in FIG. 53.

FIG. 54 is a view to show the back side of the cantilever CA2 of FIG. 53. The probe 3p is formed in the flexible portion D21, and the thickness of the flexible portion D21 is smaller than that of the support portion S21.

Figure 55:
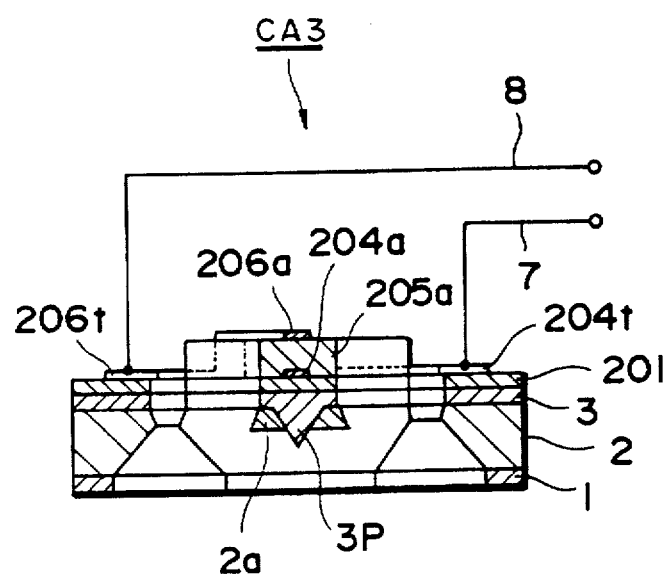
FIG. 55 is a sectional view of the cantilever when the cantilever of FIG. 53 is cut along arrow line 55.

FIG. 55 is a sectional view of this cantilever CA3 when the cantilever CA3 of FIG. 53 is cut along arrow line 55. The piezoelectric layer 205a of the flexible portion D21 is sandwiched between a portion 204a of the electrode 204 and a portion 206a of the electrode 206 and is polarized in the thickwise direction. Therefore, when the flexible portion D21 is bent, a voltage appearing between the electrodes 204a and 206a changes. This voltage is detected by the detector 50 of FIG. 53 through the conductor lines 7 and 8, thereby measuring the interatomic force acting between the probe 3p and the sample.

Figure 56:
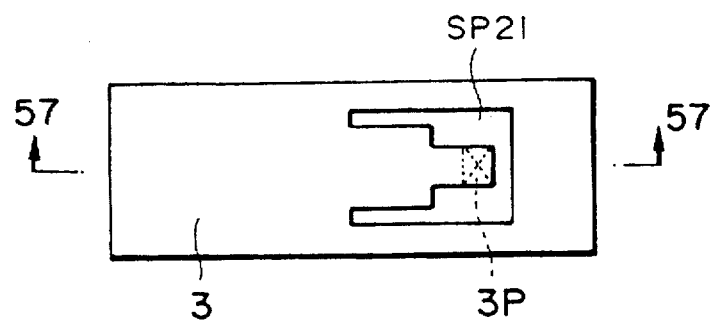
FIG. 56 is a plan view of a cantilever.
Figure 57:
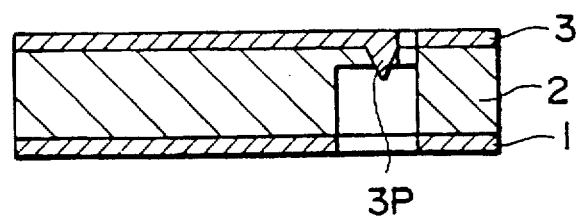
FIG. 57 is a sectional view of the cantilever when the cantilever of FIG. 56 is cut along arrow line 57—57.

FIG. 56 and FIG. 57 show the cantilever of a type an amount of flexure of which is detected using the optical lever method. This cantilever has no piezoelectric material. The cantilever may be provided with a mirror not shown on the top face thereof. This mirror may be formed, for example, of an aluminum thin film being in contact with the entire region of the top surface of the insulating layer 3 and having a uniform thickness. The thickness of this mirror is equal to that of the insulating layer 3. Laser light is reflected by the top surface of this cantilever to enter an optical displacement detector. When the cantilever is bent, the position of the laser light incident to this detector is shifted. A deviation amount of the cantilever is mechanically amplified, based on a ratio of a length of optical path between the cantilever and the detector to the length of the cantilever itself. This permits an amount of vertical movement of the probe 3p on the cantilever to be detected at the accuracy of below the angstrom order.

Figure 58:
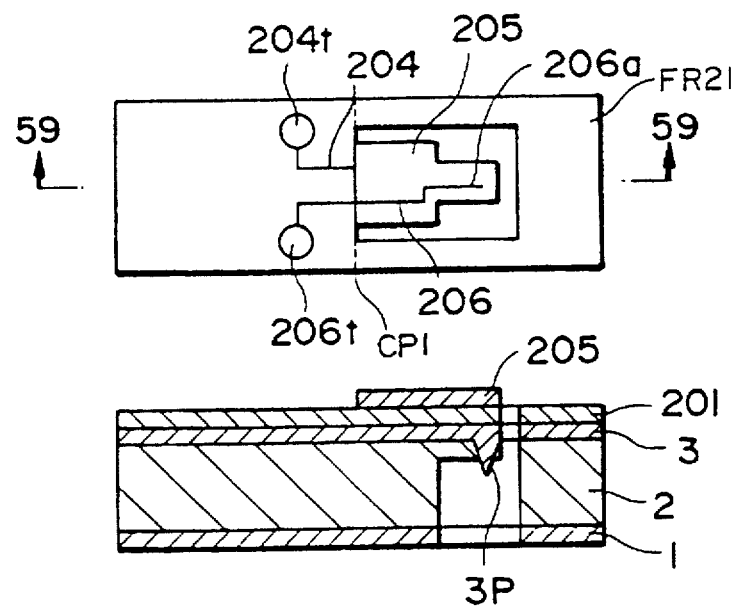
FIG. 58 is a plan view of a cantilever.
Figure 59:
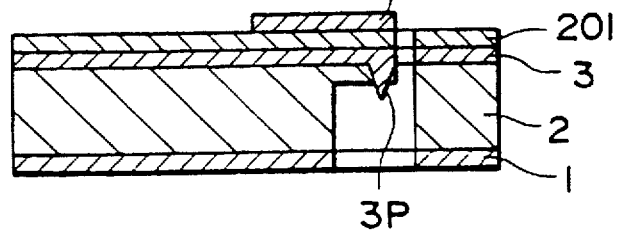
FIG. 59 is a sectional view of the cantilever when the cantilever of FIG. 58 is cut along arrow line 59—59.

FIG. 58 and FIG. 59 show a simplified form of the cantilever CA3 shown in FIG. 53. The probe 3p and support substrate S21 project in the direction from the front side to the back side of the cantilever. Namely, this direction is the [001] direction, which is perpendicular to the top plane (001) of the silicon substrate 2. Further, the cleavage plane CP1 is perpendicular to the (001) plane, and the protection frame FR21 can be separated from the main body S21 at the border of the cleavage plane CP1. The cleavage plane CP1 includes the bottom of the groove GR1, and is defined by the vectors [001] and [010]. The groove (cut) GR1 extends along the [010] direction. The (001) plane is equivalent to the (100) plane, and the [001] direction is equivalent to the [100] direction. A set of all directions equivalent to the [100] is defined as <100>. A line passing a tip point of the probe 3p and being parallel to the thickwise direction (the Z direction) of the cantilever does not intersect with the lower insulating layer 1.

Figure 60:
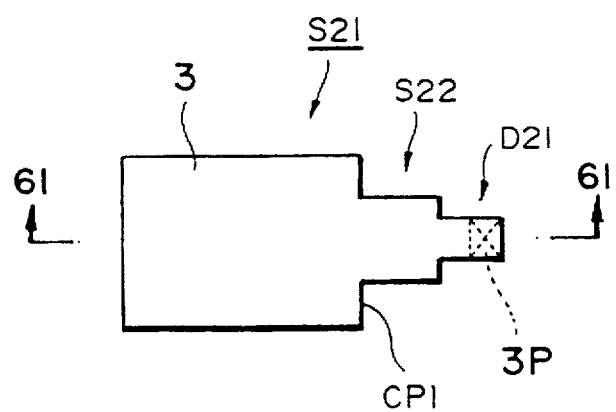
FIG. 60 is a plan view of a cantilever.
Figure 61:
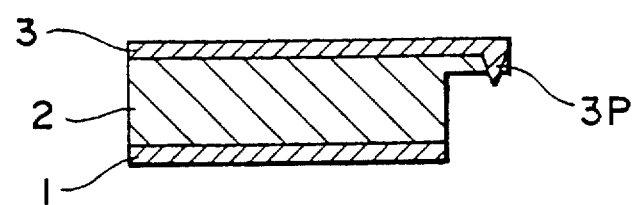
FIG. 61 is a sectional view of the cantilever when the cantilever of FIG. 60 is cut along arrow line 61—61.

FIG. 60 and FIG. 61 show the cantilever CA3 from which the protection frame FR21 is taken away. The protection frame FR21 is bent before the cantilever is used, so as to be taken away from the main body S21. This thus keeps the cantilever CA3 from being damaged even if a user directly touches the cantilever CA3 having the protection frame FR21.

A process for fabricating the cantilever shown in FIG. 56 and FIG. 57 is next explained referring to FIG. 62 to FIG. 81.

Figure 62:
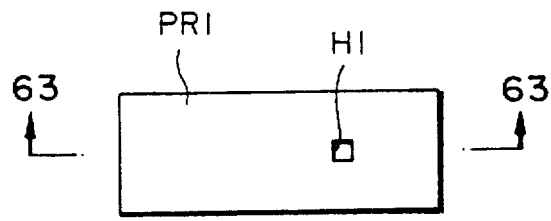
FIG. 62 is a plan view of a cantilever intermediate.
Figure 63:
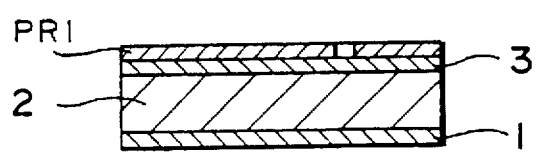
FIG. 63 is a sectional view of the cantilever intermediate when the cantilever intermediate of FIG. 62 is cut along arrow line 63—63.

FIG. 62 is a plan view of a cantilever intermediate, and FIG. 63 is a sectional view of the cantilever intermediate when the cantilever intermediate of FIG. 62 is cut along arrow line 63—63. First, the silicon nitride layers 1 and 3 are formed in the thickness 50 nm on the both faces of Si (100) single crystal substrate 2 by the CVD process. The thickness of this substrate 2 is 0.38 mm. Next, a photoresist pattern PR1 is formed on the upper silicon nitride layer 3. A through hole H1 is formed in a square shape of opening edge in the region of photoresist PR1 where the probe 3p is to be formed. Namely, after the silicon nitride layer 3 is covered with the photoresist PR1, the resist is removed from the region where the probe 3p is to be formed.

Figure 64:
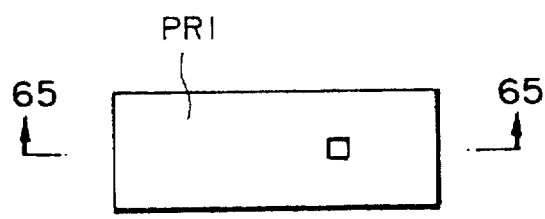
FIG. 64 is a plan view of a cantilever intermediate.
Figure 65:
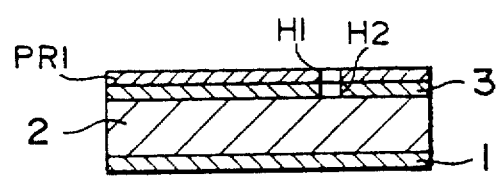
FIG. 65 is a sectional view of the cantilever intermediate when the cantilever intermediate of FIG. 64 is cut along arrow line 65—65.

FIG. 64 is a plan view of a cantilever intermediate, and FIG. 65 is a sectional view of the cantilever intermediate when the cantilever intermediate of FIG. 64 is cut along arrow line 65—65. After the formation of the through hole H1, the silicon nitride layer 3 in the region H1 is removed by the RIE process with a protection film of resist PR1. Thus, a through hole H2 having side walls aligned with those of the through hole H1 is formed in the silicon nitride layer 3.

Figure 66:
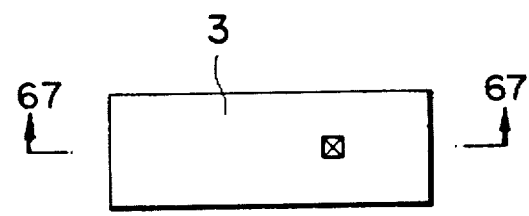
FIG. 66 is a plan view of a cantilever intermediate.
Figure 67:
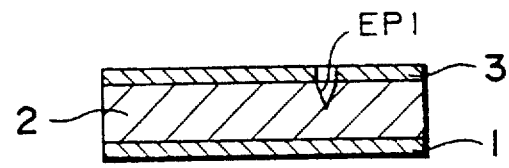
FIG. 67 is a sectional view of the cantilever intermediate when the cantilever intermediate of FIG. 66 is cut along arrow line 67—67.

FIG. 66 is a plan view of a cantilever intermediate, and FIG. 67 is a sectional view of the cantilever intermediate when the cantilever intermediate of FIG. 66 is cut along arrow line 67—67. After the formation of the through hole H2, the resist PR1 is removed from the silicon nitride layer 3 with an organic solvent, and anisotropic etching is carried out with a KOH solution, thereby forming the etch pit EP1 in the region where the probe 3p is to be formed. The etch pit EP1 has a shape of an inverted rectangular pyramid having a square bottom (opening edge).

Figure 68:
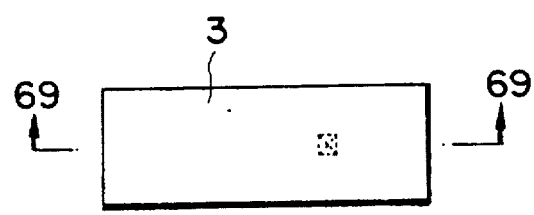
FIG. 68 is a plan view of a cantilever intermediate.
Figure 69:
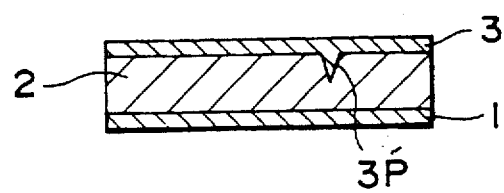
FIG. 69 is a sectional view of the cantilever intermediate when the cantilever intermediate of FIG. 68 is cut along arrow line 69—69.

FIG. 68 is a plan view of a cantilever intermediate, and FIG. 69 is a sectional view of the cantilever intermediate when the cantilever intermediate of FIG. 68 is cut along arrow line 69—69. After the formation of the etch pit EP1, silicon nitride is further deposited on the top surface of the silicon nitride layer 3 and in the etch pit EP1 by the CVD process. The thickness of silicon nitride deposited is 300 nm. Accordingly, the inside of the etch pit EP1 is filled with silicon nitride, thus forming the probe 3p.

Figure 70:
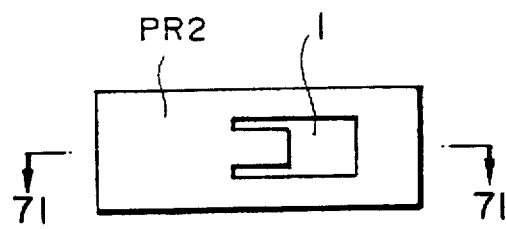
FIG. 70 is a plan view of a cantilever intermediate.
Figure 71:
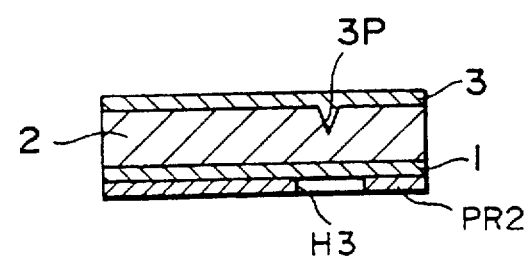
FIG. 71 is a sectional view of the cantilever intermediate when the cantilever intermediate of FIG. 70 is cut along arrow line 71—71.

FIG. 70 is a plan view of a cantilever intermediate, and FIG. 71 is a sectional view of the cantilever intermediate when the cantilever intermediate of FIG. 70 is cut along arrow line 71—71. After the formation of the probe 3p, a photoresist pattern PR2 is formed on the back face of cantilever so as to expose only the region corresponding to the space SP21 of the lower silicon nitride layer 1 and to cover the other regions. This exposed region is defined by inner walls H3 of resist PR2 and corresponds to the space SP21 consisting of the space between the flexible portion D21 and the protection frame FR21 and the space between the second support portion and the protection frame FR21.

Figure 72:
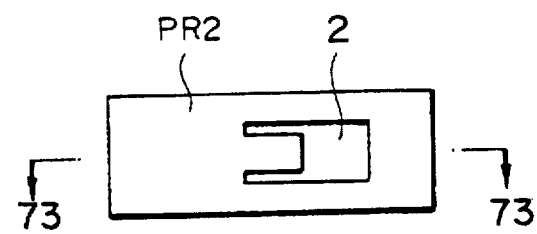
FIG. 72 is a plan view of a cantilever intermediate.
Figure 73:
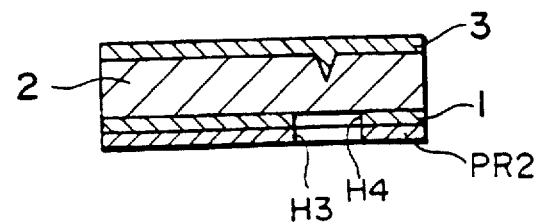
FIG. 73 is a sectional view of the cantilever intermediate when the cantilever intermediate of FIG. 72 is cut along arrow line 73—73.

FIG. 72 is a plan view of a cantilever intermediate, and FIG. 73 is a sectional view of the cantilever intermediate when the cantilever intermediate of FIG. 72 is cut along arrow line 73—73. After the formation of the photoresist pattern PR2, the exposed region of the lower silicon nitride layer 1 is etched by the RIE process using the resist PR2 as a mask, so that an etch pattern having side walls H4 aligned with the inner side walls H3 of resist PR2 is formed in the lower silicon nitride layer 1. After that, the resist PR2 is removed from the lower silicon nitride layer 1 with an organic solvent.

Figure 74:
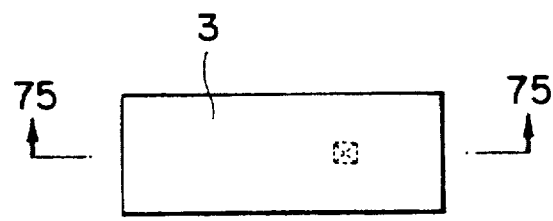
FIG. 74 is a plan view of a cantilever intermediate.
Figure 75:
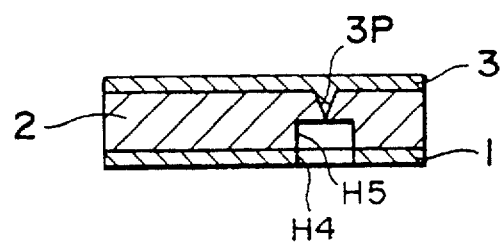
FIG. 75 is a sectional view of the cantilever intermediate when the cantilever intermediate of FIG. 74 is cut along arrow line 75—75.

FIG. 74 is a plan view of a cantilever intermediate, and FIG. 75 is a sectional view of the cantilever intermediate when the cantilever intermediate of FIG. 74 is cut along arrow line 75—75. After the removal of the resist PR2, the exposed surface of the silicon layer 2 surrounded by the side walls H4 of silicon nitride layer 1 is etched with a mask of the silicon nitride layer 1. The silicon layer 2 is etched into the depth equal to approximately the half of the thickness thereof, whereby a cavity surrounded by the side walls H5 aligned with the side walls H4 is formed in the silicon layer 2. The etchant used is the KOH solution, and the silicon layer 2 is anisotropically etched.

Figure 76:
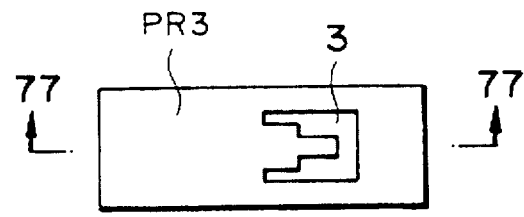
FIG. 76 is a plan view of a cantilever intermediate.
Figure 77:
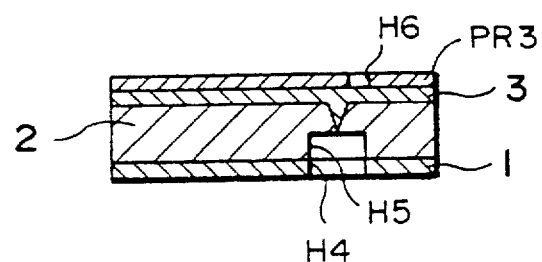
FIG. 77 is a sectional view of the cantilever intermediate when the cantilever intermediate of FIG. 76 is cut along arrow line 77—77.

FIG. 76 is a plan view of a cantilever intermediate, and FIG. 77 is a sectional view of the cantilever intermediate when the cantilever intermediate of FIG. 76 is cut along arrow line 77—77. After the formation of the side walls H5, a photoresist pattern PR3 is formed on the upper silicon nitride layer 3. The photoresist pattern PR3 is removed in the region opposed to the bottom face of the cavity defined by the side walls H5. This region is surrounded by inner side walls H6 of photoresist PR3. The photoresist PR3 may also be removed from the region corresponding to the groove GR1. The silicon nitride layer 3 is exposed in the region surrounded by the side walls H6. This region corresponds to the space SP21.

Figure 78:
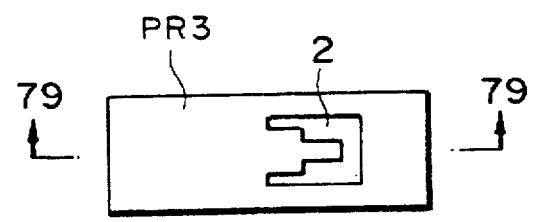
FIG. 78 is a plan view of a cantilever intermediate.
Figure 79:
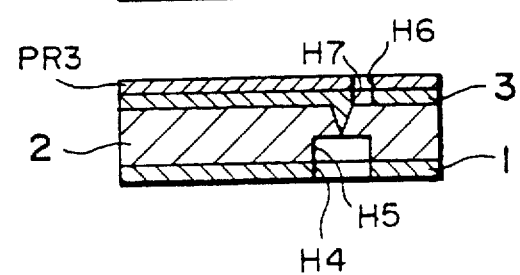
FIG. 79 is a sectional view of the cantilever intermediate when the cantilever intermediate of FIG. 78 is cut along arrow line 79—79.

FIG. 78 is a plan view of a cantilever intermediate, and FIG. 79 is a sectional view of the cantilever intermediate when the cantilever intermediate of FIG. 78 is cut along arrow line 79—79. After the formation of the photoresist pattern PR3, the exposed region of the upper silicon nitride layer 3 is etched by the RIE process using this pattern PR3 as a mask, so that an etch pattern having side walls H7 aligned with the side walls H6 of resist is formed in the silicon nitride layer 3. After that, the resist PR3 is removed from the upper silicon nitride layer 3, using an organic solvent.

Figure 80:
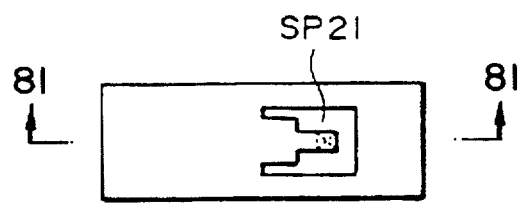
FIG. 80 is a plan view of a cantilever.
Figure 81:
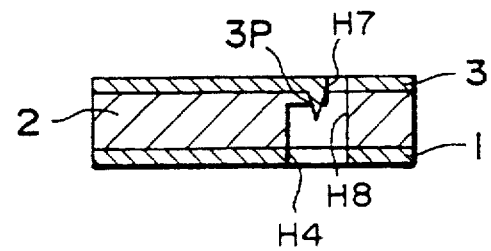
FIG. 81 is a sectional view of the cantilever when the cantilever of FIG. 80 is cut along arrow line 81—81.

FIG. 80 is a plan view of a cantilever intermediate, and FIG. 81 is a sectional view of the cantilever intermediate when the cantilever intermediate of FIG. 80 is cut along arrow line 81—81. After the removal of the resist PR 3, the silicon layer 2 is etched from the top and the bottom, using the upper silicon nitride layer 3 as a mask, thus forming the space SP21. The etchant is the KOH solution.

A process for fabricating the third cantilever CA3 is next explained. The cantilever intermediate shown in FIGS. 80 and 81 is first formed by the process as explained with FIGS. 62 to 81.

Figure 82:
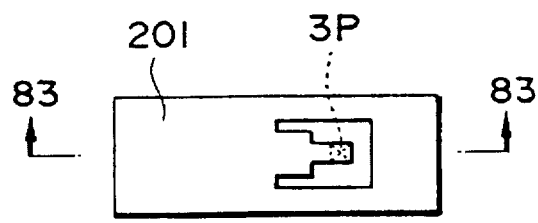
FIG. 82 is a plan view of a cantilever intermediate.
Figure 83:
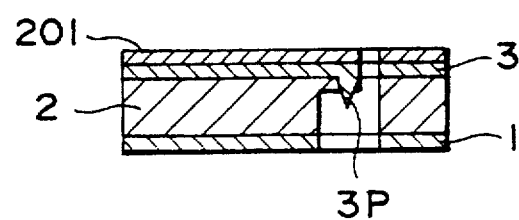
FIG. 83 is a sectional view of the cantilever intermediate when the cantilever intermediate of FIG. 82 is cut along arrow line 83—83.

FIG. 82 is a plan view of a third cantilever intermediate, and FIG. 83 is a sectional view of the cantilever intermediate when the cantilever intermediate of FIG. 82 is cut along arrow line 83—83. The cantilever intermediate of FIGS. 80 and 81 is prepared, and a MgO layer 201 is formed in the thickness 200 nm on the silicon nitride layer 2 by the sputtering process. The thickness of the cantilever intermediate this time is 15 μm.

Figure 84:
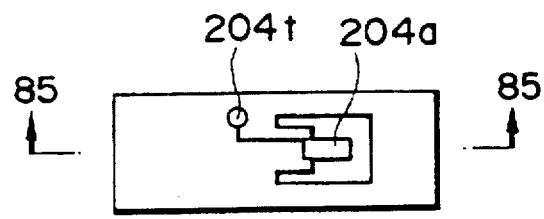
FIG. 84 is a plan view of a cantilever intermediate.
Figure 85:
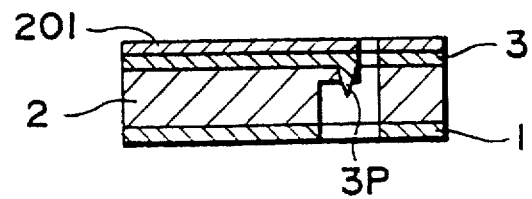
FIG. 85 is a sectional view of the cantilever intermediate when the cantilever intermediate of FIG. 84 is cut along arrow line 85—85.

FIG. 84 is a plan view of a cantilever intermediate, and FIG. 85 is a sectional view of the cantilever intermediate when the cantilever intermediate of FIG. 84 is cut along arrow line 85—85. After the formation of the MgO layer 201, the lower platinum electrode layer 204 is formed on the MgO layer 201. The lower electrode layer 204 may cover the entire surface of the flexible portion D21. A lead extends from the lower electrode layer 204a of the flexible portion D21 to be connected to the terminal 204t. The electrode 204 is formed by forming a photoresist pattern on the MgO layer 201 and thereafter vapor-depositing platinum thereon.

Figure 86:
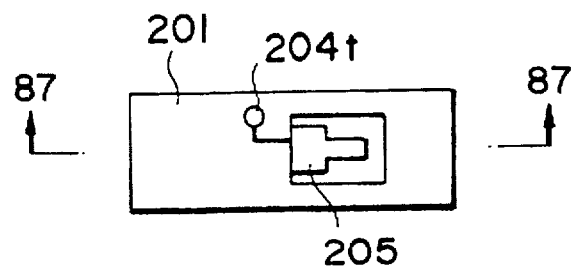
FIG. 86 is a plan view of a cantilever intermediate.
Figure 87:
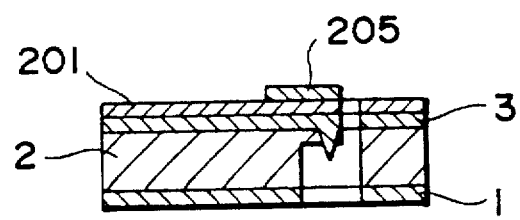
FIG. 87 is a sectional view of the cantilever intermediate when the cantilever intermediate of FIG. 86 is cut along arrow line 87—87.

FIG. 86 is a plan view of a cantilever intermediate, and FIG. 87 is a sectional view of the cantilever intermediate when the cantilever intermediate of FIG. 86 is cut along arrow line 87—87. After the formation of the lower electrode layer 204, the cantilever intermediate is masked so as to expose only the flexible portion D21 and the second support portion S22 of this cantilever intermediate, and the PZT layer 205 is formed on the exposed region in the MgO layer 201 by the sputtering process. The thickness of the PZT layer 205 is 1 μm.

Figure 88:
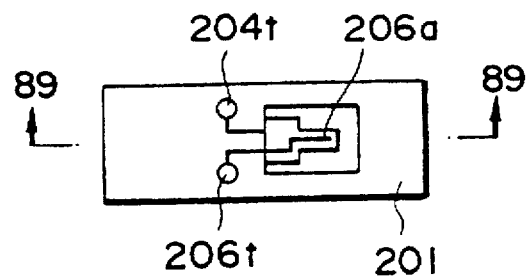
FIG. 88 is a plan view of a cantilever.
Figure 89:
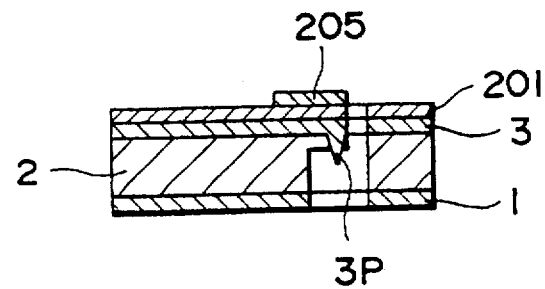
FIG. 89 is a sectional view of the cantilever when the cantilever of FIG. 88 is cut along arrow line 89—89.

FIG. 88 is a plan view of a cantilever, and FIG. 89 is a sectional view of the cantilever when the cantilever of FIG. 88 is cut along arrow line 89—89. After the formation of the PZT layer 205, the upper electrode layer 206 is formed on the PZT layer 205. The upper electrode 206 is formed by forming a photoresist pattern on the MgO layer 201 and PZT layer 205 and thereafter vapor-depositing platinum thereon. A lead extends from the upper electrode layer 206a of the flexible portion D21 to be connected to the terminal 206t.

Next explained is the scale of each portion of the cantilever.

Figure 90:
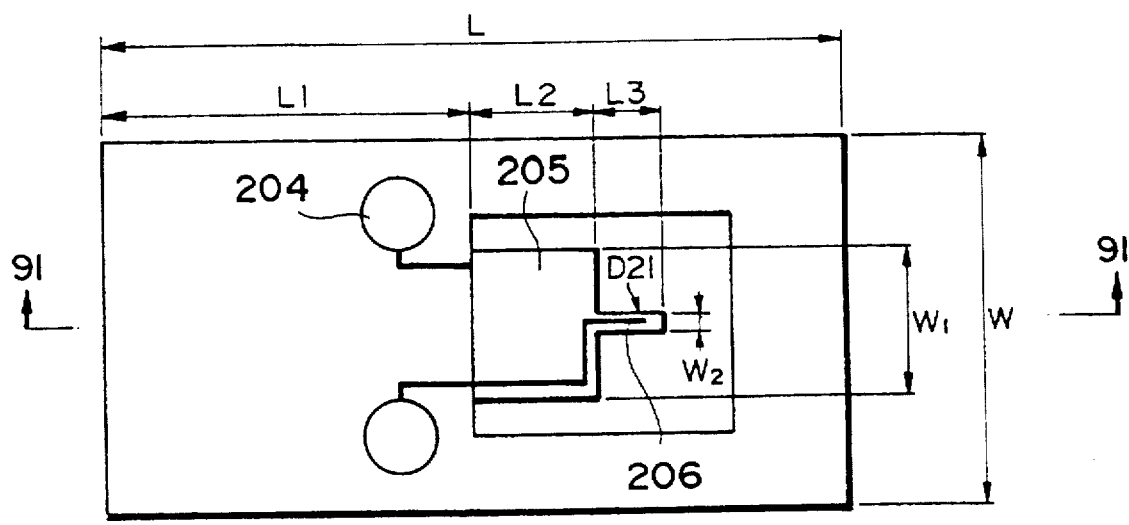
FIG. 90 is a plan view of the cantilever.
Figure 91:
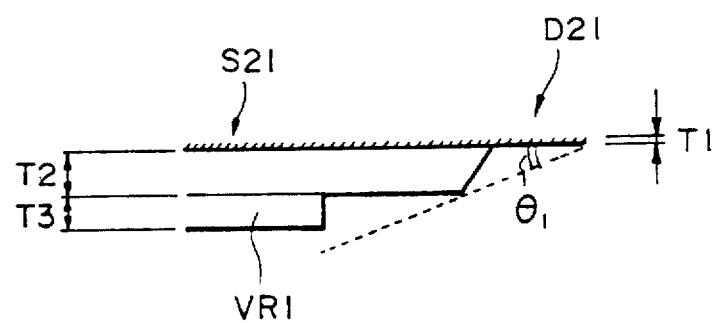
FIG. 91 is a sectional view of the cantilever when the cantilever of FIG. 90 is cut along arrow line 91—91.

FIG. 90 is a plan view of the cantilever, and FIG. 91 is a sectional view of the cantilever when the cantilever of FIG. 90 is cut along arrow line 91—91. The length L of this cantilever is 10 mm, the length L1 of the first support portion S21 is 5 mm, the length L2 of the second support portion S22 is 1.65 mm, and the length L3 of the flexible portion D21 is 0.88 mm. The width W of this cantilever is 5 mm, the width W1 of the second support portion S22 is 2 mm, and the width W2 of the flexible portion D21 is 0.20 mm. Further, the thickness T1 of the flexible portion D21 is 0.020 mm, and the thickness T2 of the first support portion S21 is 0.38 mm. This cantilever is placed on the ceramic actuator VR1. The thickness T3 of this ceramic plate VR1 is 0.30 mm. The resonance frequency of this cantilever is 38 kHz, and the spring constant thereof is 112 N/m.

Figure 92:
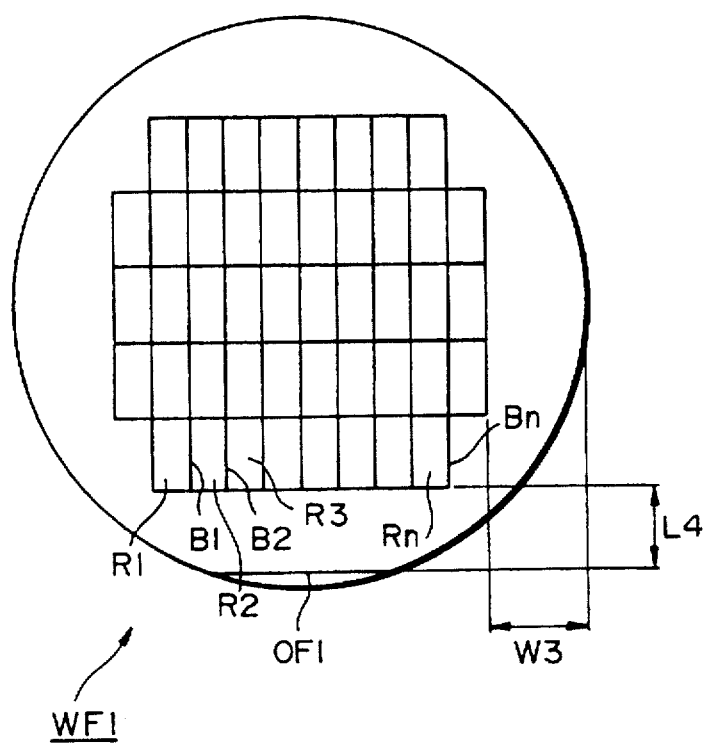
FIG. 92 is a plan view of a wafer having a plurality of cantilevers to be formed.

FIG. 92 is a plan view of a wafer in which a plurality of cantilevers are to be formed. The diameter of this silicon wafer WF1 is 3 inches, and the cantilever forming regions are set the distance of L4 apart from the orientation flat OF1. Namely, the length L4 is 11 mm, and the width W3 is 13 mm. The contour of the cantilevers $R_1$ to $R_n$ is rectangular, and the silicon nitride layer 3 at borders $B_1$ to $B_n$ between them may be removed at the step of FIG. 76. Since the silicon layer 2 exposed at the borders $B_1$ to $B_n$ is etched with the KOH solution, the cantilevers $R_1$ to $R_n$ can be separated from each other at the borders $B_1$ to $B_n$.

Figure 93:
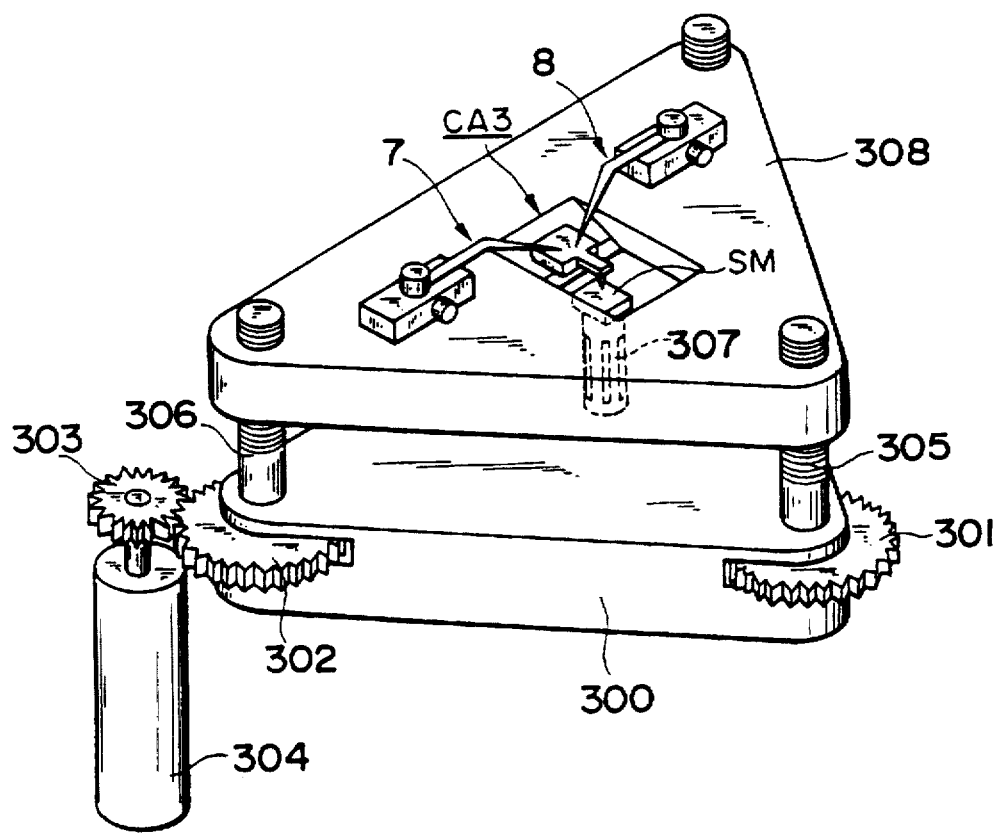
FIG. 93 is a perspective view of the AFM.
Figure 94:
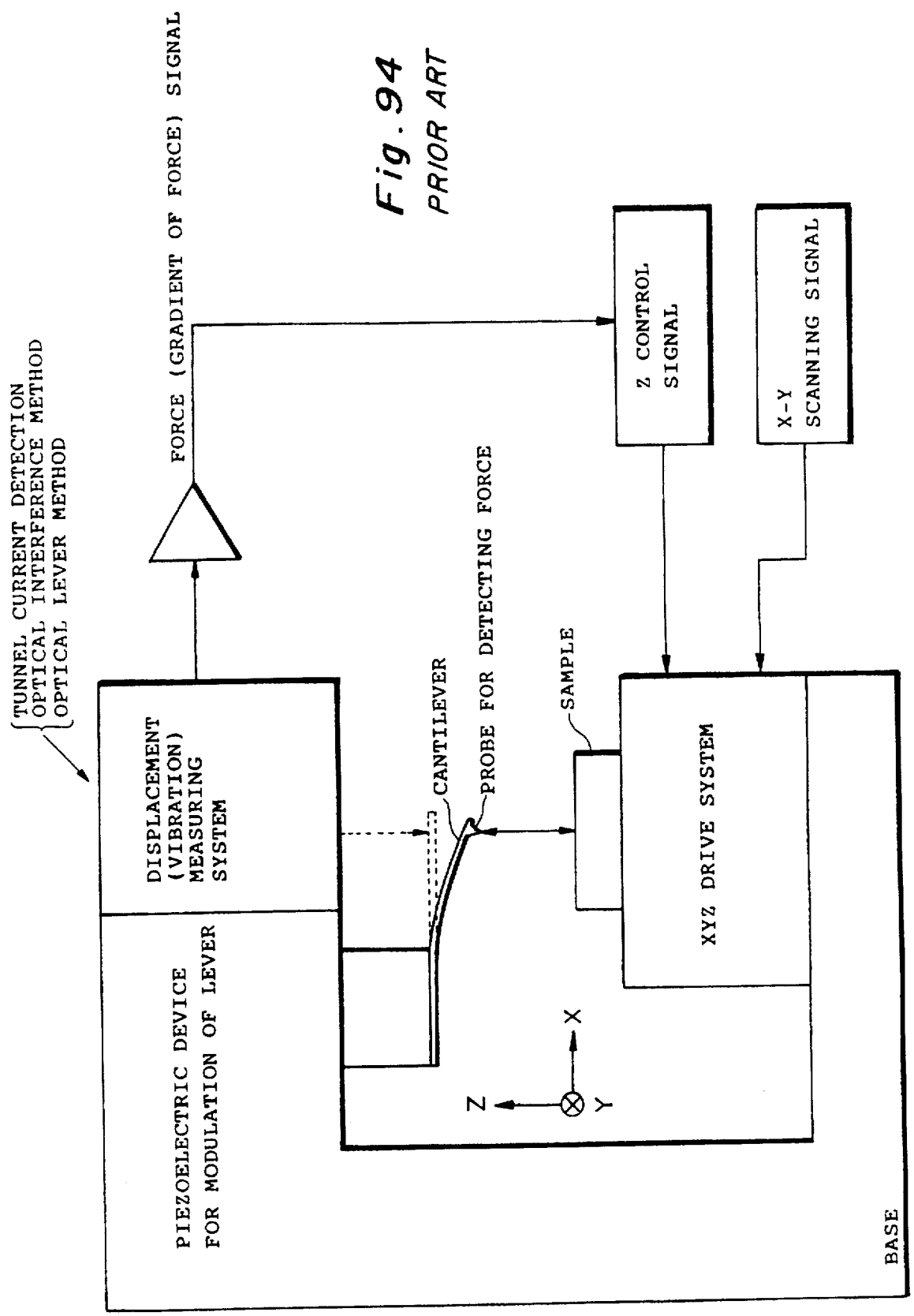
FIG. 94 is an explanatory drawing to illustrate the principle of AFM.

FIG. 93 is a perspective view of the AFM. The cantilever as described above can be applied to this AFM. This AFM is arranged so that a triangular support plate 308 is placed through adjuster screws 305 and 306 above a triangular base plate 300. These adjuster screws are located at positions corresponding to the three vertexes of the triangle, and one adjuster screw is not shown in the drawing. A gear 302 provided in the base plate 300 is rotated by a slow motor 304 for approach having a gear 303 meshing therewith, thereby moving the support plate 308 up and down at the screw 306. Further, a gear 301 is also driven by a motor not shown. The cantilever CA3 is fixed to the support plate 308. The cantilever CA3 is connected to a lower electrode probe 7 and an upper electrode probe 8, which are fixed to the support plate 308. A cavity is formed in the center of the support plate 308 as vertically piercing it. A tube type piezoelectric actuator 307 is set below the cavity. The tube piezoelectric actuator 307 can move an observing sample SM mounted thereon in the three-dimensional space when a voltage is applied to the actuator 307. During measurement the probe 3p of the cantilever CA3 is kept in contact with the surface of sample SM. When changes of resonant state of the cantilever were measured in this contact mode, the lateral resolution obtained was about 10 nm and the vertical resolution obtained was about 0.5 nm. If the length of the cantilever is short, the probe 3p is made to contact the surface of sample SM on a periodic basis, and changes of resonant state of the cantilever are detected as a piezoelectric signal from the piezoelectric crystal layer.

Next explained is a suitable length of the flexible portion of the cantilever.

Figure 95:
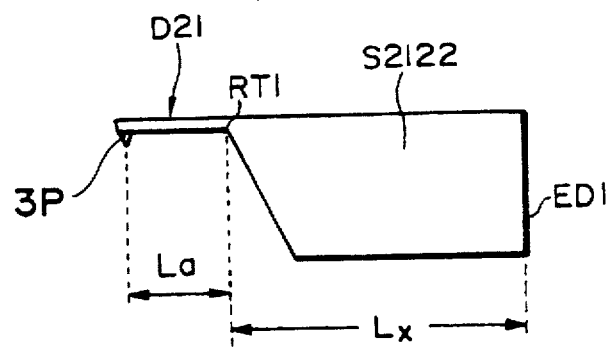
FIG. 95 is a side view of a cantilever.

FIG. 95 is a side view of a cantilever CA3 to show a simplified form of the cantilever CA3. The first support portion S21 and second support portion S22 are denoted together by symbol S2122. In FIG. 95, La represents the shortest distance from the root RT1 of the flexible portion D21, i.e., the border between the support portion S2122 and the flexible portion D21, to the probe 3p of the flexible portion D21. Further, Lx represents the distance from the border to the end ED1 of the support portion S2122. Here, La is shorter than Lx. Namely, the length of the flexible portion D21 is shorter than that of the support portion S2122.

Figure 96:
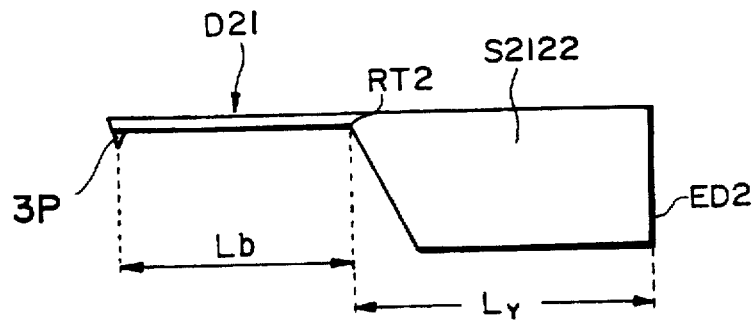
FIG. 96 is a side view of a cantilever.

FIG. 96 is a side view of another cantilever CA3 to show a simplified form of the cantilever CA3. In FIG. 96, Lb represents the shortest distance from the root RT2 of the flexible portion D21, i.e., the border between the support portion S2122 and the flexible portion D21, to the probe 3p of the flexible portion D21. Further, Ly represents the distance from the border to the end ED2 of the support portion S2122. Here, Lb is approximately equal to or longer than Ly. Namely, the length of the flexible portion D21 is equal to or longer than the length of the support portion S2122.

If the flexible portion D21 is formed by etching a silicon substrate, the thickness of the silicon substrate S2122 is at least 0.2 mm. Since the support substrate S2122 has a function as a stationary part of AFM, the thickness of the support substrate S2122 is preferably at least 0.2 mm. Therefore, also in the case where the probe 3p and support portion S2122 both project in the same direction, the thickness of the support substrate S2122 is preferably at least 0.2 mm, as shown in FIG. 95. It is also noted that the (001) Si single crystal substrate having the thickness of at least 0.2 mm is commercially available at the lowest price and on a stable basis.

However, in such case, when La is shorter than the thickness of the support substrate S2122, the support portion S2122 hinders the probe 3p from approaching the sample surface. Particularly, if the sample surface is rough, for example when La is 0.1 mm and the thickness of the silicon substrate is 0.38 mm, this disadvantage becomes outstanding. On the other hand, if the thickness of the support substrate S2122 is at least 0.2 mm and Lb is greater than this thickness, the above disadvantage is relieved. The length of Lb is preferably between 0.4 and 0.8 mm. When Lb is about 0.4 mm, the thickness of the flexible portion D21 is preferably at least 5 µm; if Lb is about 0.8 mm, the thickness of the flexible portion D21 is preferably at least 15 µm. Accordingly, the resonance frequency of the flexible portion D21 becomes 30 kHz or more, which does not overlap with sonic frequencies.

Next explained is a preferred thickness of the piezoelectric thin film 205. The thickness of the piezoelectric thin film 205 is desirably between 0.5 µm and 2 µm both inclusive. The reasons are as follows. To read piezoelectric signals would become difficult if the thickness of the piezoelectric thin film 205 were smaller than 0.5 µm. Further, if the thickness were greater than 2 µm, the film-forming period would become very long, which would increase the particle size of particles of the piezoelectric material in the thin film, resulting in lowering the mechanical strength of film.

The thickness of the flexible portion D21 except for the piezoelectric thin film 205 and the electrodes is preferably between 5 µm and 30 µm both inclusive. The flexible portion D21 of the thickness in this range can be formed by the process as described above. When the piezoelectric thin film is formed as a strain sensor on a flexible plate, residual stress occurs due to a difference between thermal expansion coefficients of the flexible plate and the piezoelectric thin film. This residual stress bends the cantilever, which makes the probe difficult to contact the surface of a measured object in actual use. When the thickness of the piezoelectric thin film and the thickness of the cantilever except for the piezoelectric thin film and electrode portion are set as described above, the strain can be relieved in the thickwise direction, and thus, the deviation due to the residual stress can be decreased.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A cantilever comprising
   a flexible portion having a probe, one end of which is adapted to be brought into vicinity of a sample;
   a support portion continuous with another end of said flexible portion; and
   a protection frame extending from said support portion and surrounding said flexible portion,
   wherein a groove is provided between said support portion and said protection frame to enable said protection frame to separate from said support portion at said groove.

2. A cantilever according to claim 1, wherein said flexible portion comprises two electrodes opposed to each other, and a piezoelectric crystal layer disposed between said electrodes.

3. A cantilever according to claim 1, wherein said flexible portion has a surface perpendicular to a direction of a thickness thereof, and wherein said probe is of a rectangular pyramid having four side faces, and an angle between each of said side faces and said surface is 54.7°.

4. A cantilever according to claim 1, wherein the thickness of said support portion is greater than 0.2 mm.

5. A cantilever according to claim 1, wherein said probe and said support portion extend longitudinally in a same direction from said flexible portion.

6. A cantilever according 1, wherein the length of said flexible portion is between 0.4 and 0.8 mm.

7. A cantilever according to claim 6, wherein the thickness of said flexible portion is greater than 0.5 μm.

8. A cantilever according to claim 1, wherein at least said flexible and support portions include:

a pair of electrodes; and a piezoelectric crystal layer arranged between said electrodes, wherein the thickness of said piezoelectric crystal layer is greater than 0.05 μm and smaller than 2 μm.

9. A cantilever according to claim 8, wherein the piezoelectric crystal layer extends from the support portion to at least the groove.

10. An assembly comprising:

a cantilever comprising:
  a flexible portion having a probe, one end of which is adapted to be brought into vicinity of a sample,
  a support portion continuous with another end of said flexible portion, and
  a protection frame extending from said support portion and surrounding said flexible portion;

a plate comprising:
  a glass substrate, and
  a printed wiring formed on said glass plate; and a mixture of beads of an insulating material and an adhesive, interposed between said plate and said cantilever.

11. An assembly according to claim 10, wherein said glass substrate is transparent, so that said printed wiring and said cantilever can thus be observed through said glass substrate.

12. An assembly according to claim 10, wherein said mixture is in contact with only said support portion and said plate.

13. A cantilever comprising:

a silicon substrate having a cavity extending into said silicon substrate in a direction of a thickness thereof, said silicon substrate having a first portion of a first thickness and a second portion of a second thickness smaller than said first thickness, said second portion extending from said first portion into said cavity; and a probe mounted to said second portion and located in said cavity.

14. A cantilever according to claim 13, wherein said silicon substrate has a groove along a cleavage plane thereof.

15. A cantilever according to claim 13, wherein said probe is made of silicon nitride and a silicon dioxide material is interposed between said probe and said second portion made of silicon.

16. A cantilever according to claim 13, further comprising:

upper and lower electrodes, a piezoelectric crystal layer interposed between said electrodes, and a silicon nitride layer interposed between said lower electrode and said second portion.

17. A cantilever according to claim 16, wherein said lower electrode comprises a platinum layer and a tantalum layer.

18. A cantilever according to claim 16, further comprising a magnesium oxide layer interposed between said piezoelectric crystal layer and silicon nitride layer.

* * * * *

UNITED STATES PATENT AND TRADEMARK OFFICE
CERTIFICATE OF CORRECTION

PATENT NO. : 5,717,132
DATED : February 10, 1998
INVENTOR(S) : Shunji WATANABE et al.

It is certified that error appears in the above-identified patent and that said Letters Patent is hereby corrected as shown below:

On the cover page, column 1, item [30] Foreign Application Priority Data, delete "May 26, 1993, Japan, 7-127598".

Signed and Sealed this

Sixteenth Day of June, 1998

Attest:

BRUCE LEHMAN

*Attesting Officer*        *Commissioner of Patents and Trademarks*